(12) United States Patent
Takeishi

(10) Patent No.: US 9,942,442 B2
(45) Date of Patent: Apr. 10, 2018

(54) IMAGE READING APPARATUS, IMAGE READING METHOD, AND MEDIUM

(71) Applicant: CANON KABUSHIKI KAISHA, Tokyo (JP)

(72) Inventor: Hiroki Takeishi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/713,797

(22) Filed: May 15, 2015

(65) Prior Publication Data

US 2015/0341520 A1 Nov. 26, 2015

(30) Foreign Application Priority Data

May 22, 2014 (JP) .................................. 2014-106020
Feb. 13, 2015 (JP) .................................. 2015-026823

(51) Int. Cl.
H04N 1/46 (2006.01)
H04N 1/04 (2006.01)
H04N 1/44 (2006.01)
H04N 1/195 (2006.01)

(52) U.S. Cl.
CPC ........... *H04N 1/44* (2013.01); *H04N 1/19594* (2013.01)

(58) Field of Classification Search
CPC ............................ H04N 1/44; H04N 1/19594
USPC ....... 358/509, 505, 520, 522, 475, 448, 474, 358/486, 488
See application file for complete search history.

(56) References Cited

U.S. PATENT DOCUMENTS

| | | | | |
|---|---|---|---|---|
| 5,774,237 A | * | 6/1998 | Nako | H04N 1/047 358/471 |
| 6,760,132 B1 | * | 7/2004 | Shibata | H04N 1/04 358/474 |
| 6,885,479 B1 | * | 4/2005 | Pilu | H04N 1/195 358/448 |
| 8,902,468 B2 | * | 12/2014 | Shimizu | H04N 1/6083 358/1.9 |
| 2002/0015103 A1 | * | 2/2002 | Shi | H04N 5/2256 348/348 |
| 2002/0050988 A1 | * | 5/2002 | Petrov | G06K 9/20 345/418 |
| 2002/0113946 A1 | | 8/2002 | Kitaguchi et al. | 353/28 |
| 2008/0151194 A1 | | 6/2008 | Segev | 353/28 |

(Continued)

FOREIGN PATENT DOCUMENTS

JP    2003-078725    3/2003

*Primary Examiner* — Cheukfan Lee
(74) *Attorney, Agent, or Firm* — Fitzpatrick, Cella, Harper & Scinto

(57) ABSTRACT

An object of the present invention is to prevent a deterioration in image quality of an acquired image resulting from the shape of an object. The present invention is an image reading apparatus that irradiates an object placed on a read table with light by using an irradiation unit, captures an image of the object by using an image capturing unit, and reads an image of the object, and the image reading apparatus includes: a measurement unit configured to measure a shape of the object; and a correction unit configured to correct an amount of light with which the irradiation unit irradiates the object based on image data of the object acquired by performing the image capturing while the irradiation unit is irradiating the object with light, and on the results of the measurement.

11 Claims, 13 Drawing Sheets

(56) References Cited

U.S. PATENT DOCUMENTS

| | | | |
|---|---|---|---|
| 2009/0237751 A1* | 9/2009 | Ishido | H04N 1/00681 358/483 |
| 2009/0290200 A1* | 11/2009 | Yoshimoto | H04N 1/02815 358/475 |
| 2010/0310129 A1* | 12/2010 | Hopfner | G06K 9/44 382/104 |
| 2012/0002248 A1* | 1/2012 | Shimokawa | H04N 1/40006 358/475 |
| 2012/0089364 A1 | 4/2012 | Takabayashi | 702/167 |
| 2012/0250108 A1* | 10/2012 | Wilsher | H04N 1/00814 358/475 |
| 2014/0146325 A1 | 5/2014 | Tabuchi | G01B 11/24 |

* cited by examiner

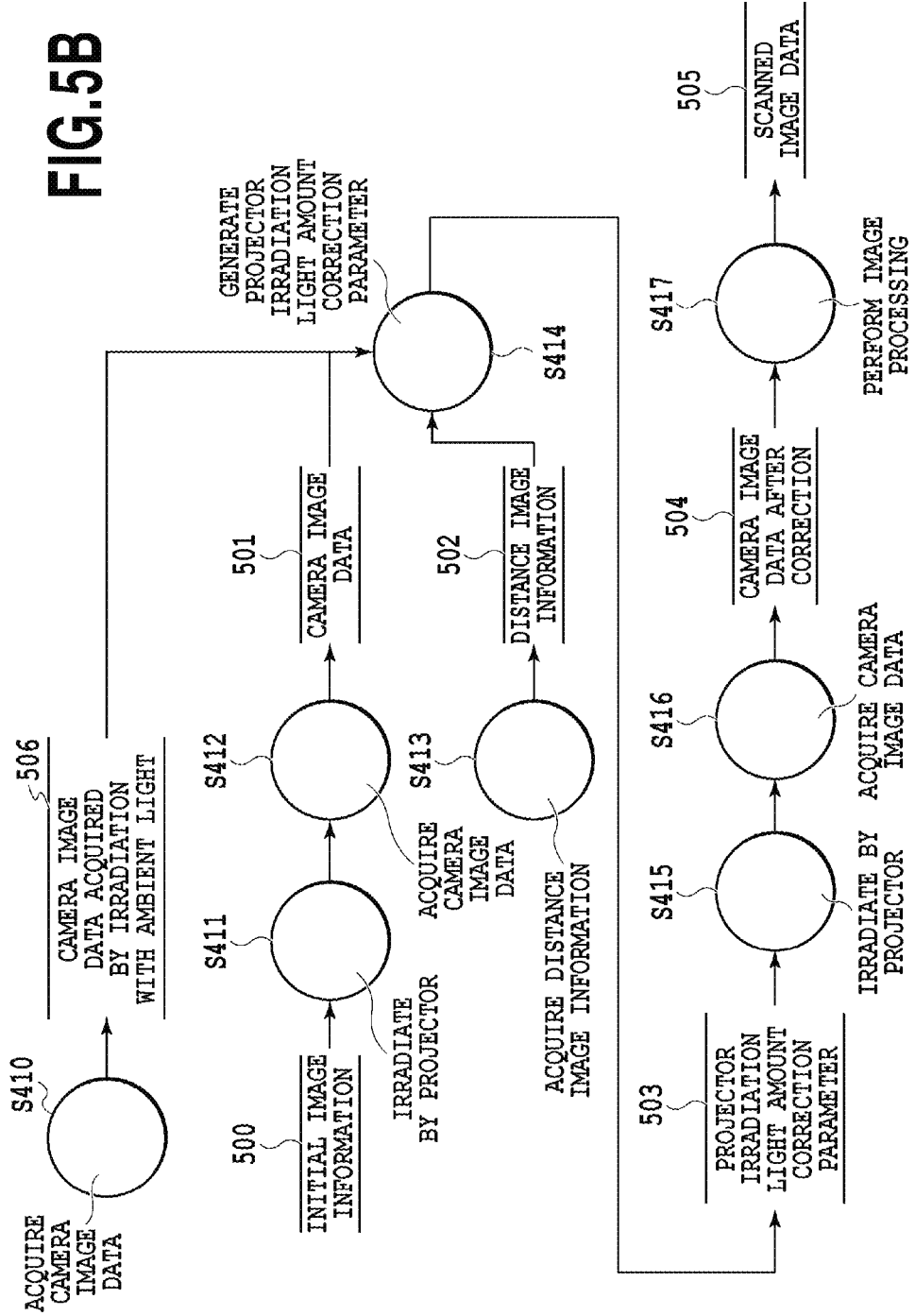

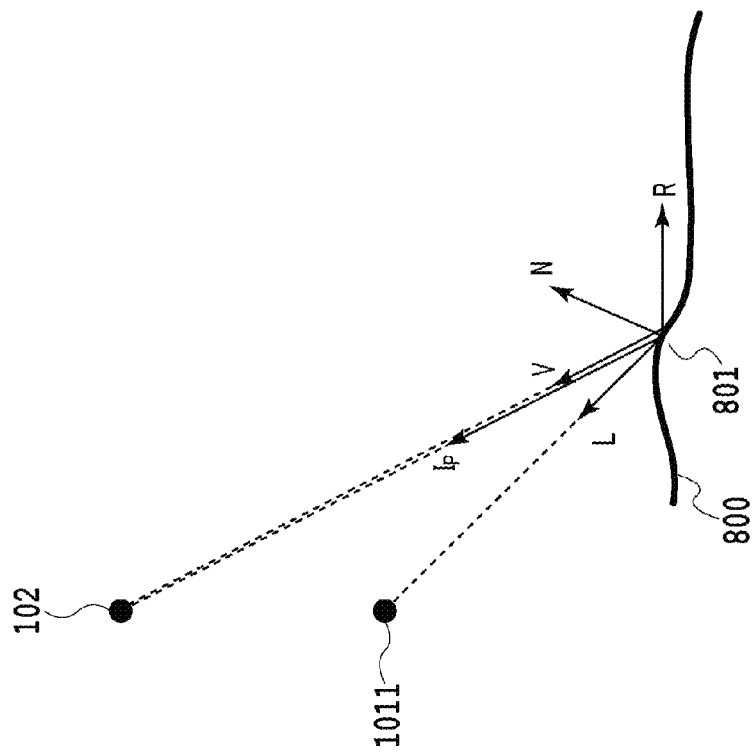
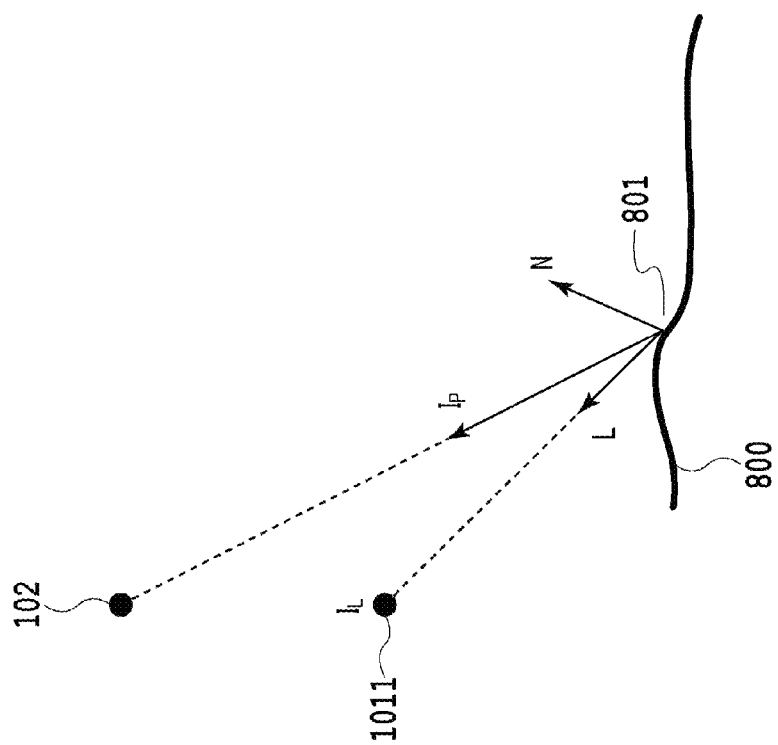

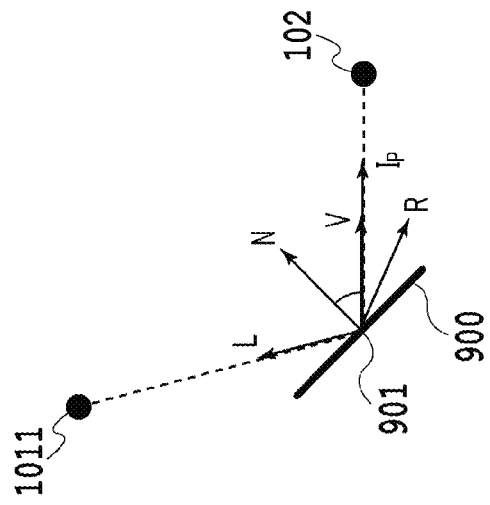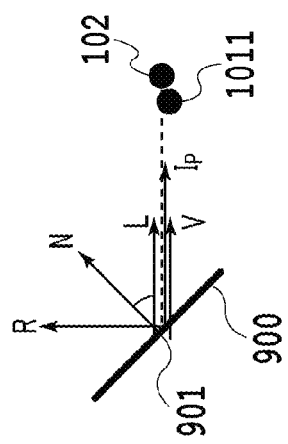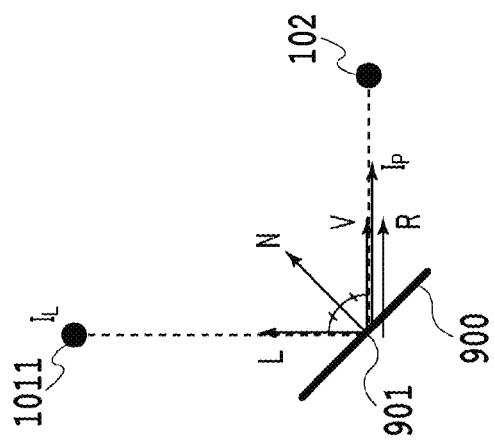

BEFORE CORRECTION
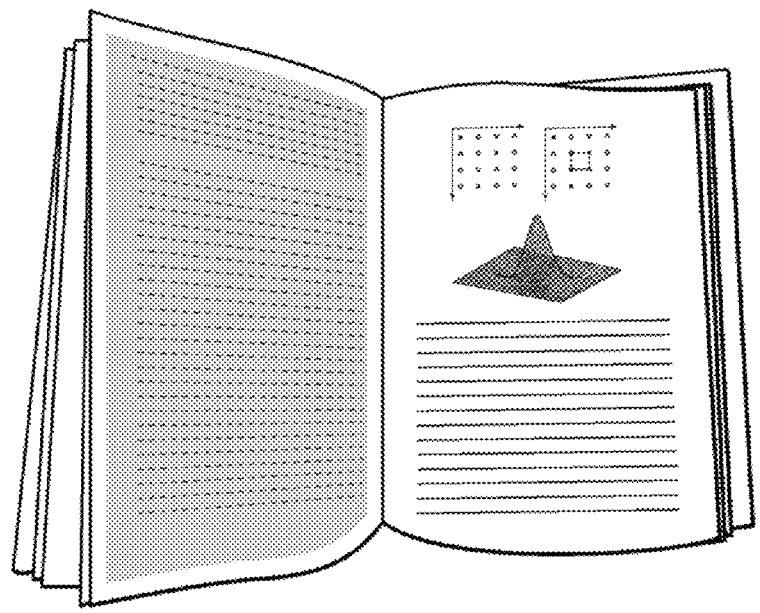
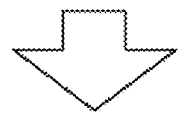
AFTER CORRECTION
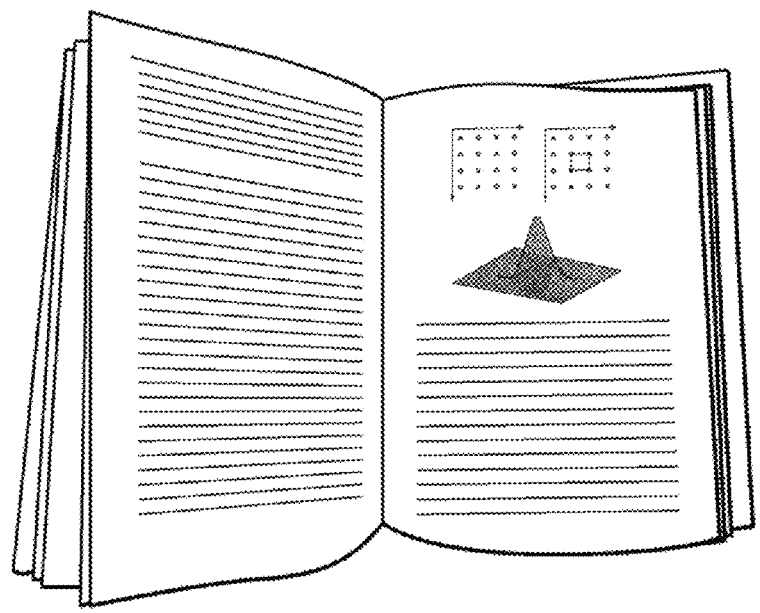
FIG.12

IMAGE READING APPARATUS, IMAGE READING METHOD, AND MEDIUM

BACKGROUND OF THE INVENTION

Field of the Invention

The present invention relates to a technique to read a document or the like by using a scanner and to save image data.

Description of the Related Art

Conventionally, as a device (so-called "scanner") that scans a document or the like and saves image data, there is a line scanner that acquires image data for each line by performing image capturing using a line sensor. As another type of scanner, there is a camera scanner that acquires two-dimensional image data by using an image capturing sensor (camera). With a camera scanner having a system in which a camera arranged above a document table captures an image of a document placed with its surface facing upward on the document table, it is possible to quickly scan a document by only placing the camera scanner thereon in the case where there is only one document, and it is also possible to easily scan a document, which is one page of a thick book, by placing the book on the document table.

Japanese Patent Laid-Open No. 2003-78725 has disclosed a camera scanner that not only scans a document sheet or a document, which is one page of a thick book, but also scans a thick three-dimensional object placed on the document table and measures the three-dimensional shape of the three-dimensional object. The camera scanner includes a light projection unit along with a camera used to perform image capturing and captures an image of a measurement pattern projected from the light projection unit by using a camera and measures the three-dimensional shape of the object placed on the document table by using the principle of triangulation. Then, the camera scanner determines whether the object placed on the document table is a flat document, a book, or a three-dimensional object based on the measurement results and performs photographing in an appropriate photographing mode in accordance with the determination results.

SUMMARY OF THE INVENTION

With the invention disclosed in Japanese Patent Laid-Open No. 2003-78725, there is a possibility that the image quality of an acquired image is reduced resulting from the shape of an object (e.g., there occurs a difference in brightness in an acquired image resulting from bumps and dips of the object).

The present invention is an image reading apparatus that irradiates an object placed on a read table with light by using an irradiation unit, captures an image of the object by using an image capturing unit, and reads an image of the object and the apparatus includes: a measurement unit configured to measure a shape of the object; and a correction unit configured to correct an amount of light with which the irradiation unit irradiates the object based on image data of the object acquired by performing the image capturing while the irradiation unit is irradiating the object with light, and on the results of the measurement.

Further features of the present invention will become apparent from the following description of exemplary embodiments (with reference to the attached drawings).

BRIEF DESCRIPTION OF THE DRAWINGS

FIG. 5A and FIG. 5B are diagrams showing data flows in the scan processing;

FIG. 8A and FIG. 8B are explanatory diagrams of a calculation method of an amount of light $I_p$;

FIG. 9A is an explanatory diagram of a generation method of coefficients d and $k_s$;

FIG. 9B is an explanatory diagram of a generation method of a coefficient $k_d$;

FIG. 9C is an explanatory diagram of a generation method of a coefficient $\alpha$;

FIG. 12 is a diagram showing an example of the effects due to the present invention.

DESCRIPTION OF THE EMBODIMENTS

Hereinafter, best aspects for embodying the present invention are explained with reference to the drawings. Configurations shown in the following are only exemplary and the present invention is not limited to the configurations shown schematically.

First Embodiment

<Configuration of Camera Scanner>

Figure 1A:
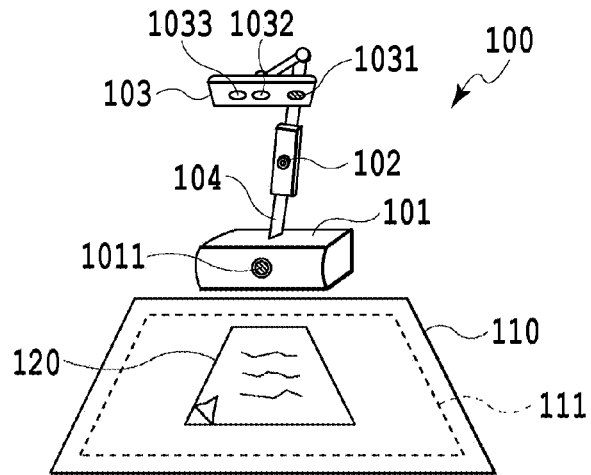
FIG. 1A, FIG. 1B, and FIG. 1C are explanatory diagrams of a camera scanner 100.
Figure 1B:
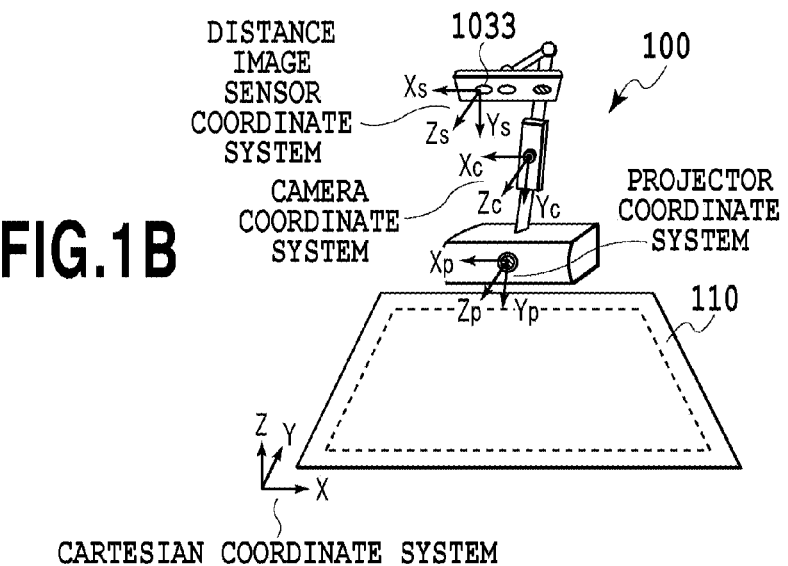
Figure 1C:
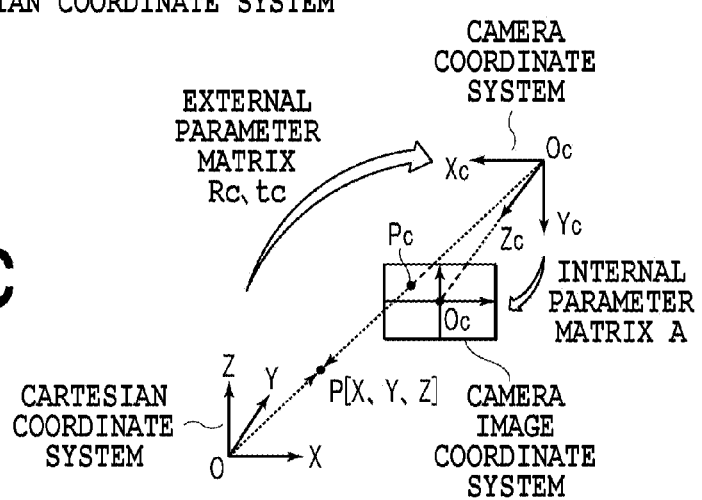

FIG. 1A, FIG. 1B, and FIG. 1C are explanatory diagrams of an image reading apparatus according to the present embodiment, more specifically, a camera scanner 100, and FIG. 1A is an external view showing a configuration example of the camera scanner 100. As shown in FIG. 1A, the camera scanner 100 includes a controller unit 101, a camera unit 102, and a distance image sensor unit 103. The controller unit 101 and the camera unit 102 are linked by an arm unit 104, and the camera unit 102 and the distance image sensor unit 103 are also linked by the arm unit 104.

The controller unit 101 includes a CPU, a RAM, a ROM, etc., and controls the camera unit 102 and the distance image sensor unit 103. Further, the controller unit 101 includes a projector 1011 that irradiates light. Details of the controller unit 101 will be described layer (see FIG. 2).

The camera unit 102 has a lens and the lens is caused to face a read table 110 made of a white matte (non-glossy) material. The camera unit 102 captures an image of an object placed in a reading area 111 on the read table 110 (e.g., in the example in FIG. 1A, a document 120 is placed) and acquires image data of the object.

The distance image sensor unit 103 has a lens and the lens is caused to face the read table 110. The distance image sensor unit 103 reads the inside of the reading area 111 on the read table 110 via this lens. Here, the distance image sensor unit 103 includes a sensor that adopts the infrared pattern projection system and consists of an infrared pattern projection unit 1031, an infrared camera unit 1032, and an RGB camera unit 1033. The infrared pattern projection unit 1031 projects a three-dimensional measurement pattern formed by infrared beams not visible to the human eye onto the object placed in the reading area 111. The infrared camera unit 1032 reads the three-dimensional measurement pattern projected onto the object. The RGB camera unit 1033 separates the light in the visible light wavelength band reflected from the surface of the object into three areas, i.e., red, green, and blue areas, and records the areas as RGB signals.

FIG. 1B is a diagram showing a coordinate system in the camera scanner 100. In the present embodiment, a plurality of different coordinate systems is defined for the camera scanner 100 as shown in FIG. 1B.

In other words, for the controller unit 101, a coordinate system (XpYpZp coordinate system) called a projector coordinate system is defined. In the projector coordinate system, an image plane of an image that is projected by the projector 1011 is defined as an XpYp plane and the direction perpendicular to the XpYp plane is defined as a Zp-direction.

For the camera unit 102, a coordinate system (XcYcZc coordinate system) called a camera coordinate system is defined. In the camera coordinate system, an image plane (camera image plane) of an image captured by the camera unit 102 is defined as an XcYc plane and the direction perpendicular to the XcYc plane is defined as a Zc-direction.

For the distance image sensor unit 103, a coordinate system (XsYsZs coordinate system) called a distance image sensor coordinate system is defined. In the distance image sensor coordinate system, an image plane of an image captured by the RGB camera unit 1033 is defined as an XsYs plane and the direction perpendicular to the XsYs plane is defined as a Zs-direction.

Further, in order to make it possible to systematically handle three-dimensional data of the three independent coordinate systems, a Cartesian coordinate system (XYZ coordinate system) is defined in which a plane including the read table 110 is defined as an XY plane and the upward direction vertical to the XY plane is defined as a Z-axis positive direction.

FIG. 1C is a diagram showing a relationship between the Cartesian coordinate system (XYZ coordinate system), the camera coordinate system (XcYcZc coordinate system), and the camera image plane. By using FIG. 1C, an example of transformation of coordinate systems is explained while indicating the relationship between the space represented by the Cartesian coordinate system (XYZ coordinate system), the space represented by the camera coordinate system (XcYcZc coordinate system) with the camera unit 102 as a center, and the image plane of the image captured by the camera unit 102. It is possible to transform a three-dimensional point P [X, Y, Z] in the Cartesian coordinate system into a three-dimensional point Pc [Xc, Yc, Zc] in the camera coordinate system by using expression (1).

$$[X_c, Y_c, Z_c]^T = [R_c | t_c][X, Y, Z, 1]^T \qquad \text{expression (1)}$$

Here, Rc is a rotation matrix, which is a 3×3 matrix whose elements are external parameters that are obtained from the posture of the camera with respect to the Cartesian coordinate system (i.e., the orientation of the camera, which indicates the degree through which the camera rotates with respect to the Cartesian coordinate system), and tc is a translation vector, which is a vector whose elements are external parameters that are obtained from the position of the camera with respect to the Cartesian coordinate system. Opposite to expression (1) it is possible to transform the three-dimensional point Pc [Xc, Yc, Zc] in the camera coordinate system into the three-dimensional point [X, Y, Z] in the Cartesian coordinate system by using expression (2).

$$[X, Y, Z]^T = [R_c^{-1} | -R_c^{-1} t_c][X_c, Y_c, Z_c, 1]^T \qquad \text{expression (2)}$$

Coordinate information in the coordinate system (camera image coordinate system), in which the image plane of a two-dimensional camera image that is acquired by performing image capturing using the camera unit 102 is defined as an xy plane, is obtained as the results of transforming the three-dimensional information in the three-dimensional space into two-dimensional information using the camera unit 102. In other words, two-dimensional coordinates pc [xp, yp] in the camera image coordinate system are derived by performing transparent projection transformation by using expression (3) for the three-dimensional point Pc [Xc, Yc, Zc] in the camera coordinate system, into which the three-dimensional point P [X, Y, Z] in the Cartesian coordinate system has been transformed by using expression (1).

$$\lambda[x_p, y_p, 1]^T = A[X_c, Y_c, Z_c]^T \qquad \text{expression (3)}$$

Here, A is an internal parameter matrix of the camera, which is a 3×3 matrix whose elements are parameters, such as the focal length and the image center position.

As above, by using expressions (1) to (3), it is possible to transform the coordinates in the three-dimensional point group represented by the Cartesian coordinate system into the coordinates in the three-dimensional point group in the camera coordinate system or into the coordinates in the two-dimensional point group in the camera image coordinate system. It is assumed that the internal parameters of each hardware device and the position and posture (external parameters) with respect to the Cartesian coordinate system have already been calibrated by the publicly-known calibration method. Hereinafter, in the case where the three-dimensional point (group) is referred to with no proviso, it is assumed that the three-dimensional data in the Cartesian coordinate system is referred to.

<Hardware Configuration of the Controller Unit 101>

Figure 2:
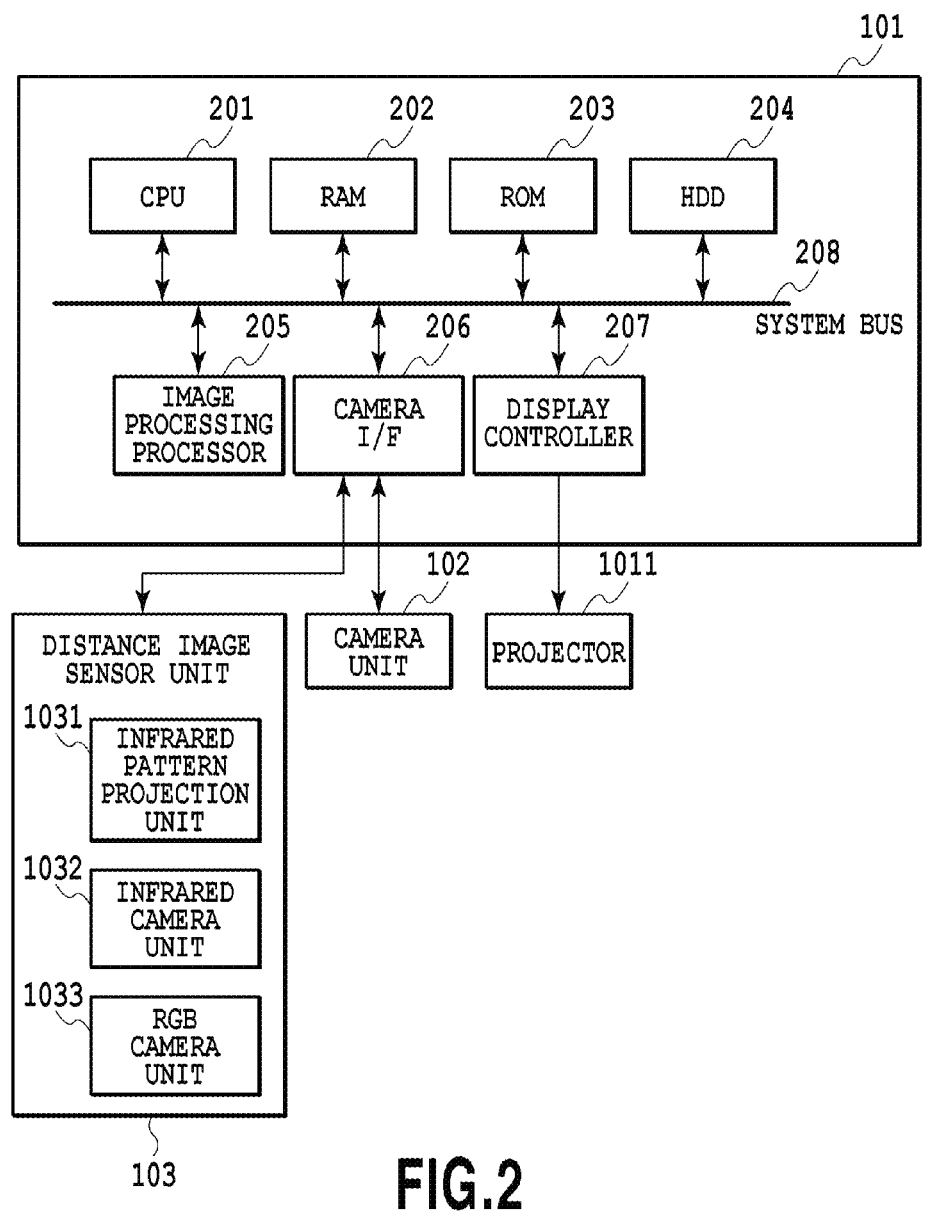
FIG. 2 is a block diagram showing a hardware configuration of a controller unit 101.

FIG. 2 is a block diagram showing a hardware configuration of the controller unit 101. As shown in FIG. 2, the controller unit 101 includes a CPU 201, a RAM 202, a ROM 203, an HDD 204, an image processing processor 205, a camera I/F 206, and a display controller 207. These components are connected with one another via a system bus 208 and it is possible to transmit and receive information via the system bus 208.

The CPU 201 is a central processing unit that controls the operation of the whole of the controller unit 101. The RAM 202 is a volatile memory. The ROM 203 is a nonvolatile memory in which a program to activate the CPU 201 is stored. The HDD 204 is a large capacity hard disk drive compared to the RAM 202. In the HDD 204, programs to control the camera scanner 100, which are executed by the CPU 201, are stored.

In the case where the camera scanner 100 is activated by turning the power source on, the CPU 201 executes the activation program (corresponding to the publicly-known boot loader or the like) stored in the ROM 203. The activation program is a program that is executed in advance in order to read a control program stored in the HDD 204 and to develop the read control program onto the RAM 202. After executing the activation program and developing the control program onto the RAM 202, the CPU 201 starts the control of the camera scanner 100 by executing the developed control program without interruption. Temporary data used for the processing that is performed in accordance with the control program is stored in the RAM 202. The CPU 201 reads and writes the temporary data from and to the RAM 202. It is also possible to store data related to various settings that are necessary for the processing performed in accordance with the control program and image data generated by inputting data by a camera in the HDD 204, in addition to the control program. The data such as this is also read from and written to the HDD 204 by the CPU 201.

The image processing processor 205 reads image data stored in the RAM 202, performs image processing on the read image data, and overwrites the image data after being subjected to the image processing to the RAM 202. The image processing performed by the image processing processor 205 is, for example, the publicly-known processing, such as rotation, scaling, and color conversion.

The camera I/F 206 is connected with the camera unit 102 and the distance image sensor unit 103. The camera I/F 206 acquires image data from the camera unit 102 and information about the distance and image (hereinafter, distance image information) from the distance image sensor unit 103 in accordance with instructions from the CPU 201. The acquired image data and distance image information are written to the RAM 202. Further, the camera I/F 206 transfers the control commands received from the CPU 201 to the camera unit 102 and the distance image sensor unit 103. Thereby, the CPU 201 performs control, such as a setting for the camera unit 102 and the distance image sensor unit 103.

The display controller 207 controls a display in accordance with instructions from the CPU 201. In the present embodiment, the display controller 207 is connected to the projector 1011 and controls projection based on the image data by the projector 1011.

<Software Configuration of Control Program of the Camera Scanner 100>

Figure 3B:
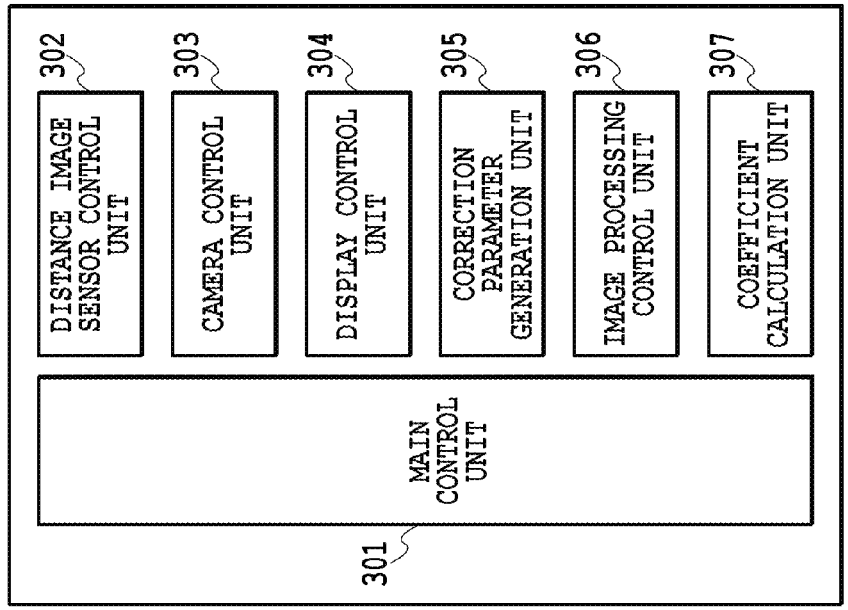
FIG. 3A and FIG. 3B are block diagrams showing software configurations of control programs of the camera scanner 100.
Figure 3A:
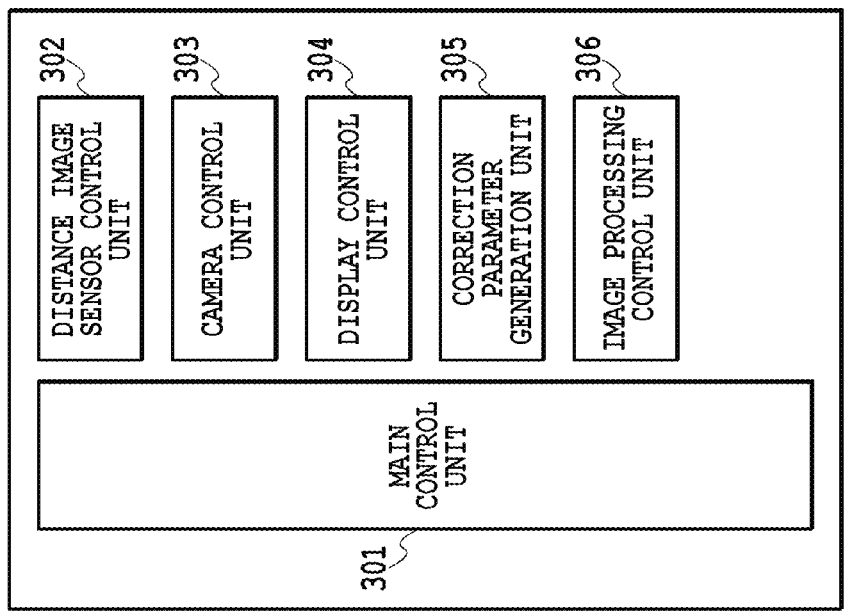

FIG. 3A is a block diagram showing a software configuration of a control program of the camera scanner 100, which is executed by the CPU 201 in order to implement scan processing according to the present embodiment. As described above, the control program is stored in the HDD 204 and developed onto the RAM 202 at the time of the activation of the camera scanner 100 and executed. Hereinafter, a software module group that the control program has is explained.

As shown in FIG. 3A, the control program includes a main control unit 301, a distance image sensor control unit 302, a camera control unit 303, a display control unit 304, a correction parameter generation unit 305, and an image processing control unit 306.

The main control unit 301 implements the scan processing (details of the scan processing will be described later) according to the present embodiment, which is performed by the camera scanner 100, by comprehensively controlling the following software modules.

The distance image sensor control unit 302 acquires distance image information generated by the distance image sensor unit 103 by controlling the distance image sensor unit 103 via the camera I/F 206 and stores the acquired distance image information in the RAM 202.

The camera control unit 303 acquires image data generated by the camera unit 102 by controlling the camera unit 102 via the camera I/F 206 and stores the acquired image data in the RAM 202.

The display control unit 304 controls the projector 1011 via the display controller 207. Specifically, the display control unit 304 causes the projector 1011 to function as a light source and to irradiate light based the image information stored in the RAM 202 or the like. The image information referred to here is multivalued two-dimensional raster bitmap data, data including a pixel value (e.g., luminance value, density value, etc.) of each pixel.

The correction parameter generation unit 305 generates a correction parameter (hereinafter, projector irradiation light amount correction parameter) for correcting the amount of irradiation light of the projector 1011 based on the distance image information acquired by the distance image sensor unit 103 and the image data acquired by the camera unit 102, which are stored in the RAM 202. Details of correction parameter generation processing will be described later.

The image processing control unit 306 controls the image processing processor 205 and performs image processing (e.g., processing such as rotation, scaling, and color conversion) on the image data stored in the RAM 202 or the like.

<Scan Processing Performed by the Camera Scanner 100>

Figures 4A, 4B:
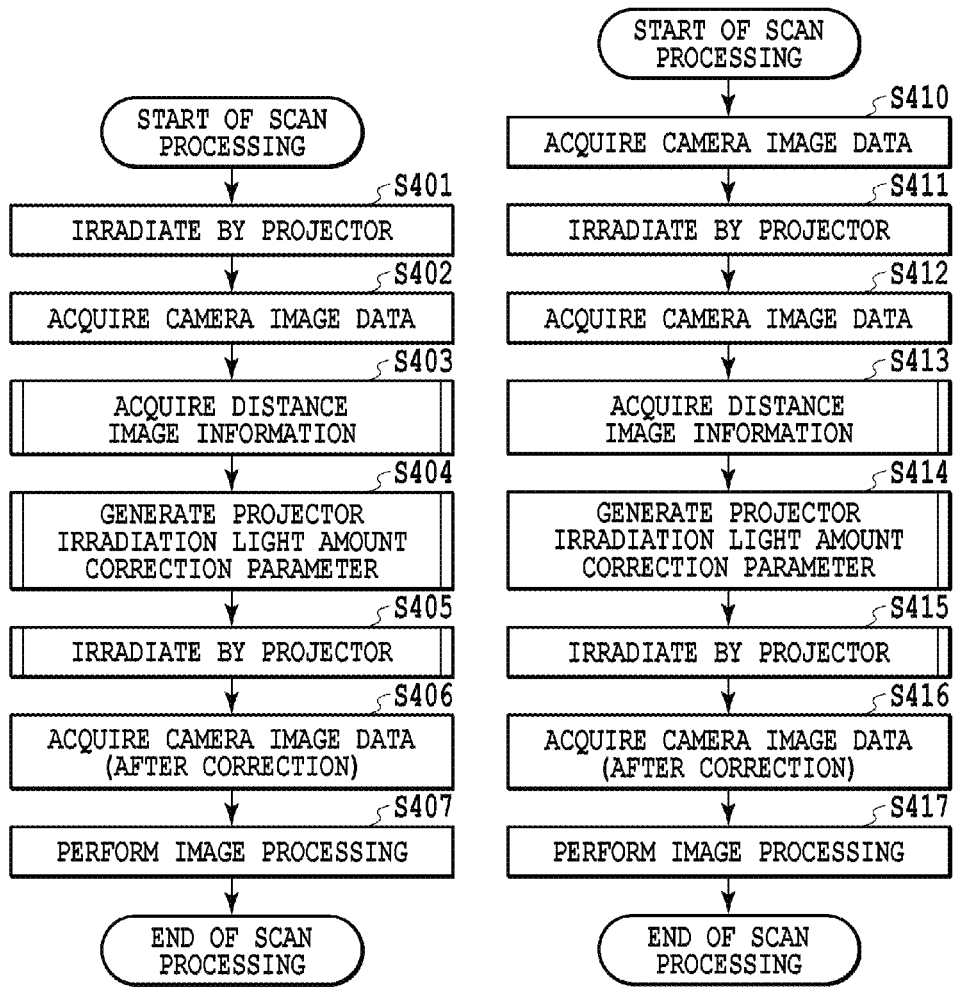
FIG. 4A and FIG. 4B are flowcharts showing flows of scan processing.
Figure 5A:
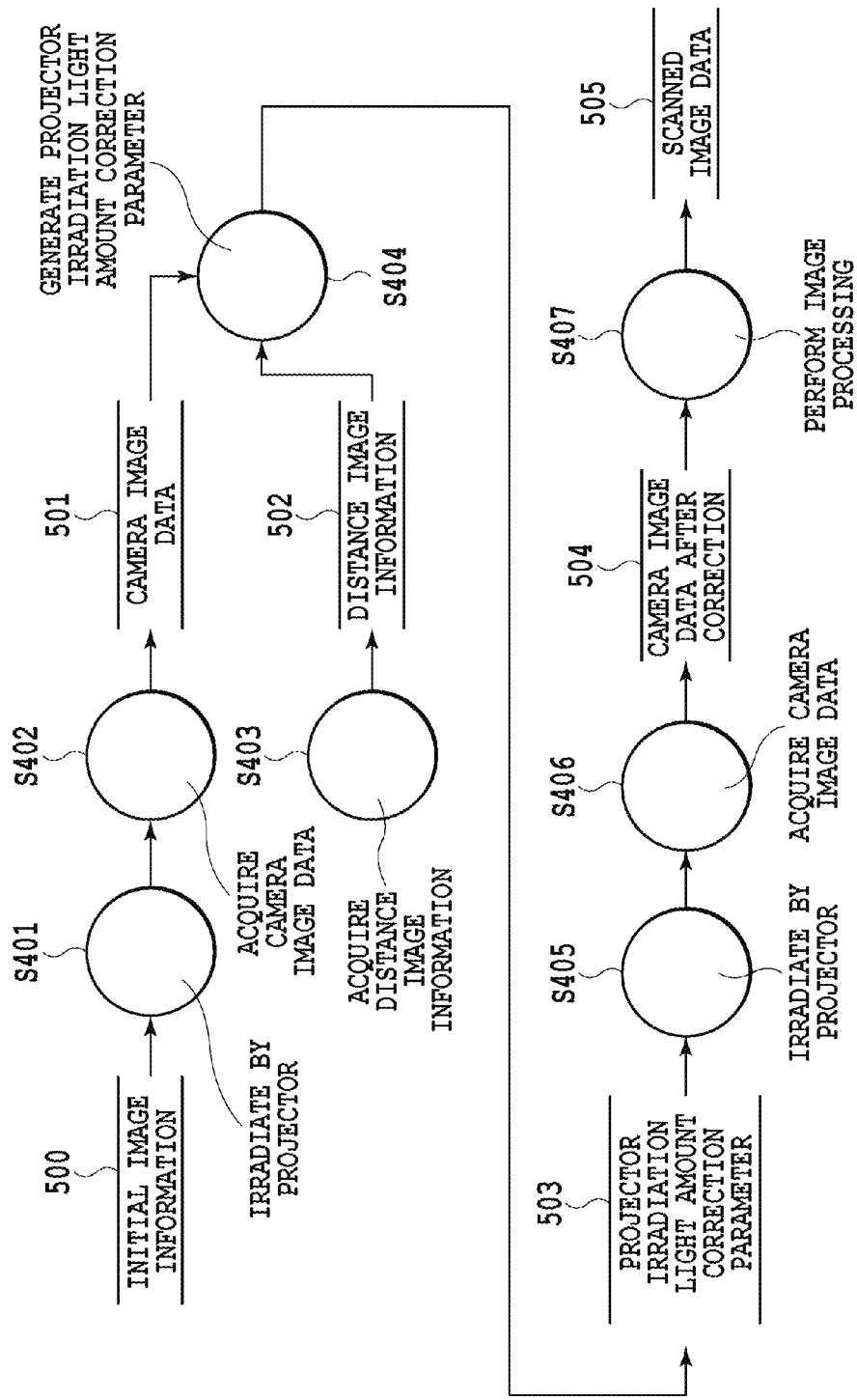

FIG. 4A is a flowchart showing a flow of the scan processing according to the present embodiment, which is performed by the camera scanner 100. The scan processing according to the present embodiment is implemented by the software modules other than the main control unit 301 of the control program sequentially performing processing under the comprehensive control by the main control unit 301. FIG. 5A is a data flow diagram explaining the scan processing according to the present embodiment by focusing attention on the data that is saved in the RAM 202. Hereinafter, by using FIG. 4A and FIG. 5A, the scan processing according to the present embodiment is explained in detail.

At step S401, the display control unit 304 controls the projector 1011 via the display controller 207 and causes the projector 1011 to irradiate light onto the reading area 111 based on initial image information 500. Here, the initial image information 500 is multivalued two-dimensional raster bitmap data and has the following three features.

(1) All the pixels are achromatic.

(2) The luminance values or density values of all the pixels are less than a maximum value and greater than a minimum value.

(3) All the pixels have the same luminance value or density value. However, as long as errors are within an allowable error range (about 5%), the luminance values or density values of all the pixels may not be the same but may substantially be the same.

In addition, in the present embodiment, it is assumed that the raster bitmap data is represented by an RGB color space and an n-bit depth of each color. At this time, it is assumed that the color component value of each pixel in the raster bitmap data has the following value.

$$R = G = B = \frac{2^n}{2} \qquad \text{expression (4)}$$

At step S402 that is performed while the projector 1011 is irradiating light at S401, the camera control unit 303 acquires camera image data 501 by controlling the camera unit 102 via the camera I/F 206. The acquired camera image data 501 is saved in the RAM 202.

At step S403, the distance image sensor control unit 302 acquires distance image information 502 by controlling the distance image sensor unit 103 via the camera I/F 206. The acquired distance image information 502 is saved in the RAM 202. Here, the distance image information 502 includes information about the distance between the distance image sensor unit 103 and each part of a scan-target object. The information about the distance is data in the raster bitmap format including the pixel value (distance value) of each pixel, and is two-dimensional array data having a large value for the portion of the scan-target object, which is near to the distance image sensor unit 103, and a small value for the portion distant from the distance image sensor unit 103. Details of distance image information acquisition processing that is performed at this step will be described later.

At step S404, the correction parameter generation unit 305 generates projector irradiation light amount correction parameter 503 based on the camera image data 501 acquired at step S402 and the distance image information 502 acquired at step S403 and saves the parameter 503 in the RAM 202. Details of projector irradiation light amount correction parameter generation processing that is performed at this step will be described later.

At step S405, the display control unit 304 controls the projector 1011 via the display controller 207 and causes the projector 1011 to irradiate light onto the reading area 111 in accordance with the projector irradiation light amount correction parameter 503 generated at step S404. Details of projector irradiation processing that is performed at this step will be described later.

At step S406 that is performed while the projector 1011 is irradiating light at step S405, the camera control unit 303 acquires corrected cameral image data 504 by controlling the camera unit 102 via the camera I/F 206. The acquired corrected cameral image data 504 is saved in the RAM 202.

At step S407, the image processing control unit 306 performs image processing on the corrected cameral image data 504 acquired at step S406 by controlling the image processing processor 205. The image data on which the image processing has been performed is saved in the RAM 202, the HDD 204, etc., as final scanned image data 505. The image processing referred to here is, for example, processing to acquire raster bitmap data in which characters and images within a document are erect, which is obtained by cutting out the area corresponding to document 120 placed within the reading area 111. It may also be possible to add processing other than the processing described above, such as the publicly-known color unevenness correction and image sharpening processing, to the image processing.

<Distance Image Information Acquisition Processing>

Figure 6A:
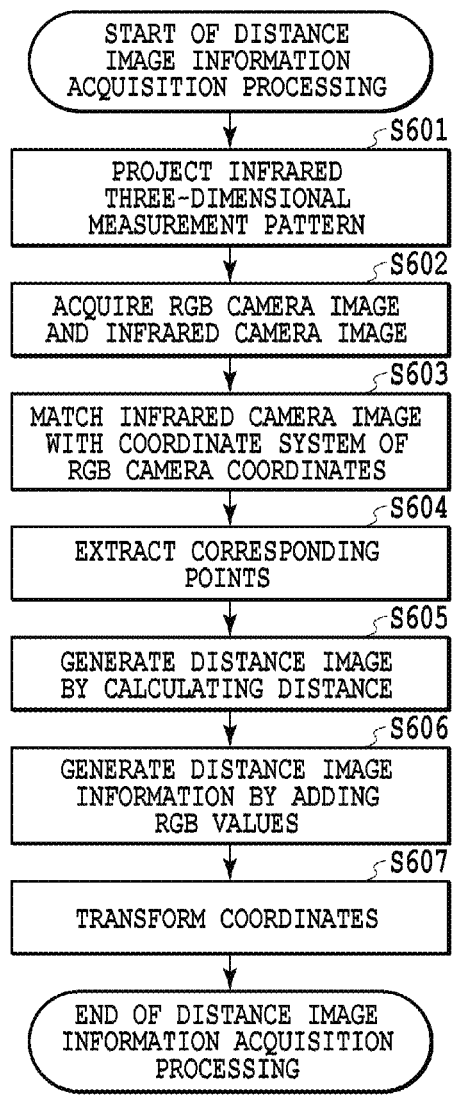
FIG. 6A, FIG. 6B, FIG. 6C, and FIG. 6D are explanatory diagrams of distance image information acquisition processing.

Hereinafter, the above-described distance image information acquisition processing (step S403 in FIG. 4A) is explained in detail by using FIGS. 6A to 6D. Here, FIG. 6A is a flowchart showing a flow of the distance image information acquisition processing and FIG. 6B, FIG. 6C, and FIG. 6D are diagrams for explaining the distance measurement principle by using the pattern projection system.

Figure 6B:
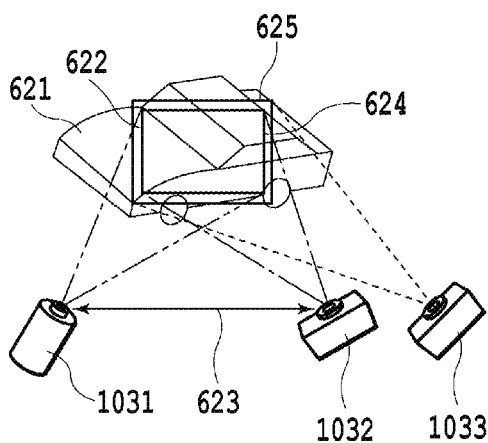
Figure 6C:
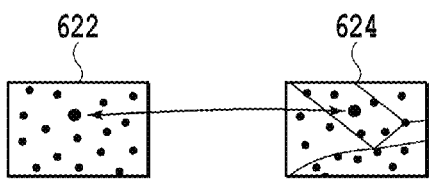
Figure 6D:
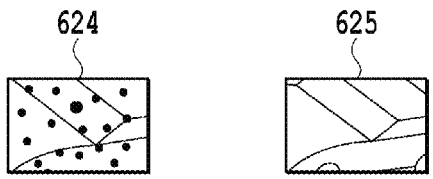

After the distance image information acquisition processing is started, first, at step S601, a three-dimensional shape measurement pattern 622 formed by infrared beams is projected on an object 621 by using the infrared pattern projection unit 1031 as shown in FIG. 6B.

At step S602, an RGB camera image 625 is acquired by capturing an image of the object 621 by using the RGB camera unit 1033. Further, an infrared camera image 624 is acquired by capturing an image of the three-dimensional shape measurement pattern 622 projected at step S601 by using the infrared camera unit 1032. The position at which the infrared camera unit 1032 is set differs from the position at which the RGB camera unit 1033 is set, and therefore, the captured image area of the RGB camera image 625 differs from that of the infrared camera image 624 as shown in FIG. 6D. At this time, a setting is performed so that the captured image area of the RGB camera unit 1033 is larger than that of the infrared camera unit 1032. The reason is that the infrared camera image 624 is matched with the coordinate system of the RGB camera image 625 at the subsequent step S603.

At step S603, the infrared camera image 624 is matched with the coordinate system of the RGB camera image 625 by transforming the coordinate system of the infrared camera unit 1032 into the coordinate system of the RGB camera unit 1033. It is assumed that the relative position relationship between the infrared camera unit 1032 and the RGB camera unit 1033, and the internal parameters of both the cameras are already known by calibration processing performed in advance.

At step S604, as shown in FIG. 6C, points corresponding to each other between the three-dimensional shape measurement pattern 622 and the infrared camera image 624 whose coordinates have been transformed at step S603 are extracted. For example, in the case where a point on the infrared camera image 624 is searched for and the same point is detected from the three-dimensional shape measurement pattern 622, the point on the infrared camera image 624 and the point on the three-dimensional shape measurement pattern 622 are associated with each other. Alternatively, it may also be possible to extract points corresponding to each other by searching for a portion whose pattern resembles a pattern including a pixel of interest and pixels adjacent to the pixel of interest in the infrared camera image 624 from the three-dimensional shape measurement pattern 622 (by performing pattern matching), and by associating the portion whose similarity is the highest in the three-dimensional shape measurement pattern 622 with the pattern.

At step S605, the distance from the infrared camera unit 1032 up to each part of the object is calculated for each pixel by performing calculation using the triangulation principle by using a straight line connecting the infrared pattern projection unit 1031 and the infrared camera unit 1032 as a reference line 623. The triangulation referred to here is the measuring method using the triangulation for determining the position of a point by measuring the angle formed by the reference line and a straight line connecting one of the points located at both ends of the reference line and a point desired to be measured and the angle formed by the reference line and another straight line connecting the other point of the reference line and the point desired to be measured, respectively, and geometry. The triangulation principle is already known, and therefore, detailed explanation is omitted. At this step, for the pixel in the position of the point that can be associated with the corresponding point at step S604, the distance from the infrared camera unit 1032 up to each part of the object is calculated and the calculated distance is saved as the pixel value. On the other hand, for the pixel in the position that cannot be associated with the corresponding position at step S604, the part is determined to be a part for which distance measurement cannot be performed and an invalid value is saved as the pixel value. By performing this processing on all the pixels of the infrared camera image 624 for which the coordinate transformation has been performed at step S603, a distance image including the pixel value (distance value) for each pixel is generated.

At step S606, by saving the RGB values of the RGB camera image 625 for each pixel of the distance image, distance image information having four kinds of pixel values, i.e., R, G, B, and distance, for each pixel is generated. The distance image information generated here is based on the distance image sensor coordinate system (XsYsZs coordinate system) defined for the RGB camera unit 1033 of the distance image sensor unit 103.

Because of this, at the next step S607, as described above by using FIG. 1B, the distance image information in the distance image sensor coordinate system is transformed into distance image information in the Cartesian coordinate system.

In the present embodiment, as described above, the case where the distance image sensor unit 103 adopting the infrared pattern projection system is used is explained, but it is also possible to use a distance image sensor unit adopting another system. For example, it may also possible to use a distance image sensor unit adopting the stereo system that generates a stereoscopic vision by using two RGB cameras or adopting the time of flight (TOF) system that measures distance by detecting the time of flight of a laser beam.

The above is the contents of the distance image information acquisition processing.

<Projector Irradiation Light Amount Correction Parameter Generation Processing>

Figures 7A, 7B:
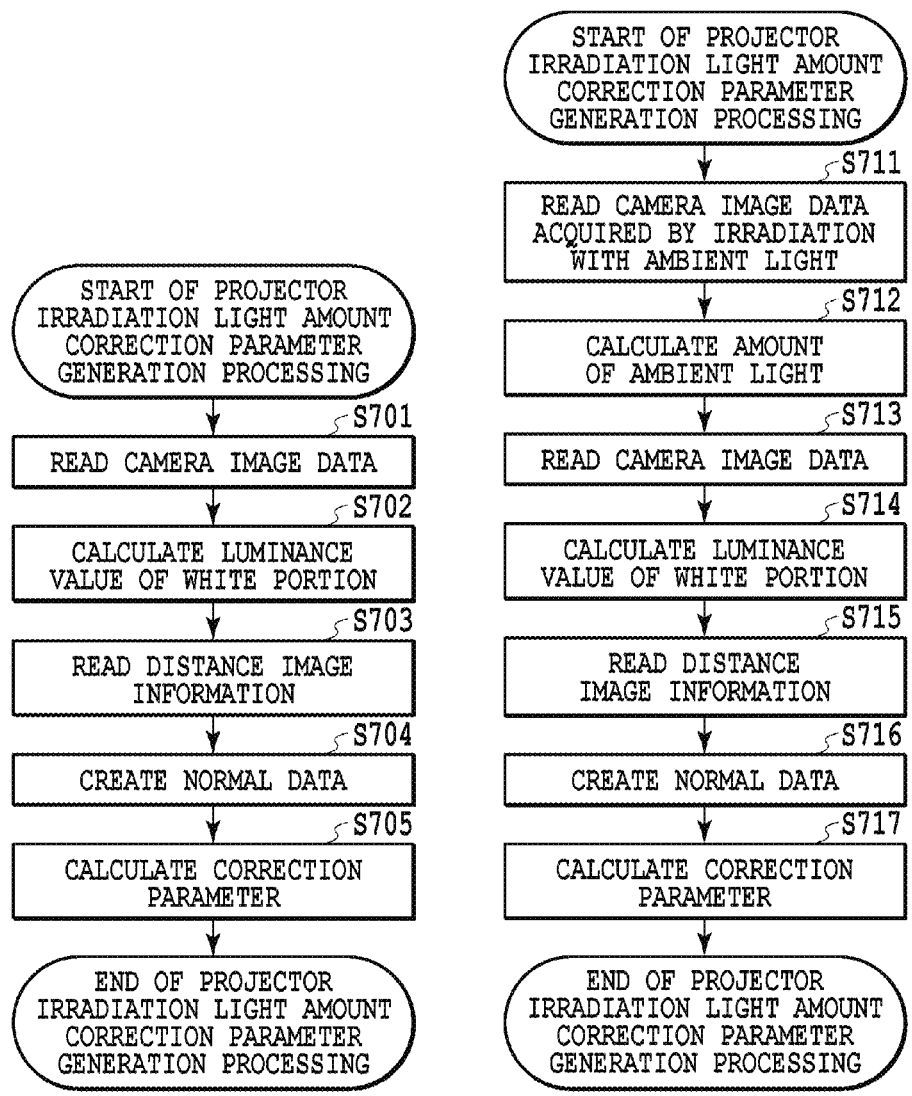
FIG. 7A and FIG. 7B are flowcharts showing flows of projector irradiation light amount correction parameter generation processing.

Hereinafter, the above-described projector irradiation light amount correction parameter generation processing (step S404 in FIG. 4A) is explained in detail by using FIG. 7A. FIG. 7A is a flowchart showing a flow of the projector irradiation light amount correction parameter generation processing at step S404.

At step S701, the correction parameter generation unit 305 reads the camera image data 501 saved in the RAM 202.

At step S702, the correction parameter generation unit 305 finds a luminance value $i_{Max}$ of the white portion from the camera image data 501 read at step S701. In the processing to find the luminance value $i_{Max}$, first, the pixel at the coordinates (x, y)=(i, j) of the camera image data 501 is taken to be the pixel of interest and a luminance value $L_{ij}$ is found from color component values ($R_{ij}$, $G_{ij}$, $B_{ij}$) of the pixel of interest by the following operation.

$$L_{ij}=\text{Max}(R_{ij},G_{ij},B_{ij}) \quad \text{expression (5)}$$

Here, Max is an operation to find a maximum value from among given elements.

As another embodiment that is different from the method of finding the luminance value $L_{ij}$ described above, it is also possible to embodiment the present invention by calculating the luminance value $L_{ij}$ by using expression (6) in conformity with the NTSC video standard as follows.

$$L_{ij}=0.3\times R_{ij}+0.59\times G_{ij}+0.11\times B_{ij} \quad \text{expression (6)}$$

In the present embodiment, an array $L_{cam}$ of the luminance values of the camera image data 501 having a width of width pixels and a height of height pixels is defined as $L_{cam}=(L_{11}, L_{12}, L_{13}, \ldots, L_{21}, L_{22}, L_{23}, \ldots, L_{width\_height})$. Then, the luminance value $i_{Max}$ is found by the following processing.

$$i_{Max}=\text{Max}(L_{cam}) \quad \text{expression (7)}$$

In other words, at step S702, the luminance value $i_{Max}$ is found by scanning all the pixels of the given camera image data 501 and by finding the maximum luminance value from among the luminance values of all the pixels. Further, a luminance value $i_{Min}$ is found by the following processing.

$$i_{Min}=\text{Min}(L_{cam}) \quad \text{expression (8)}$$

Here, Min is an operation to find a minimum value from among given elements. In other words, at step S702, the luminance value $i_{Min}$ is found by scanning all the pixels of the given camera image data 501 and by finding the minimum luminance value from among the luminance values of all the pixels.

At step S703, the correction parameter generation unit 305 reads the distance image information 502 saved in the RAM 202.

At step S704, the correction parameter generation unit 305 derives a surface normal of the scan-target object based on the distance image information 502 read at step S703. The surface normal that is derived here is a normal vector group of each mesh in mesh data of a three-dimensional shape. There are two methods of finding the normal vector of each mesh as follows.

The first method is a method of creating mesh data of the distance image information 502 and calculating the normal vector of each mesh from the created mesh data.

The second method is a method of directly calculating the normal vector from the distance image information 502. Specifically, for a group of points of interest (a plane is estimated, and therefore, at least three points of interest are necessary), an approximate plane is estimated and the vertical direction to the estimated approximate plane is estimated as the normal direction of the mesh. The approximation calculation of the plane can be implemented by using the least-squares. More specifically, it is possible to express the method of directly calculating the normal vector by a mathematical expression below. It is assumed that $p_i$ is the point of interest, C is a covariance matrix whose elements are distances between points in the vicinity of the point of interest (hereinafter, close points) in the distance image represented by the distance image information 502 and the central point of the group of the points of interest, k is the number of close points, $$\bar{p} \quad \text{expression (9)}$$

is an average of the group of close points, $\lambda_j$ is a jth covariance eigenvalue matrix, and $$\vec{v}_j \quad \text{expression (10)}$$

is a jth eigenvalue. At this time, it is possible to calculate the normal vector of the mesh by using an expression below.

$$C = \frac{1}{k}\sum_{i=1}^{k}(p_i-\bar{p})\cdot(p_i-\bar{p})^T \quad \text{expression (11)}$$

$$C\cdot\vec{v}_j = \lambda_j\cdot\vec{v}_j$$

$$j \in \{0, 1, 2\}$$

However, from the above-described expression, whether the direction of the normal vector is into the plane of the paper or out of the plane of the paper is not determined. In the present embodiment, it is assumed that the direction of the normal vector at this time is out of the plane of the paper, i.e., toward the camera unit 102.

Further, a normalized vector N of the normal is found in advance from the normal vector. The normalized vector N is necessary at the time of calculating an amount of light $I_p$ at the subsequent step S705 (details will be described later).

In the present embodiment, the least-squares method is used for finding an approximate plane from the distance image information 502, but is it is possible to embody the present invention by using another approximation method.

At step S705, the correction parameter generation unit 305 generates the projector irradiation light amount correction parameter 503 including the pixel value of each pixel corresponding to the physical position on the reading area 111 and saves the parameter 503 in the RAM 202.

The above is the contents of the projector irradiation light amount correction parameter generation processing.

<Calculation of Correction Parameter $I_{in}$>

The processing at step S705 described above is explained in detail. At step S705, first, the correction parameter generation unit 305 initializes the projector irradiation light amount correction parameter 503 by setting all the array elements of the projector irradiation light amount correction parameter 503 to zero, which is a two-dimensional array corresponding to the reading area 111. Next, the correction parameter generation unit 305 calculates a correction parameter $I_{in}$ for each pixel in the projector irradiation light amount correction parameter 503, which is a two-dimensional array.

Hereinafter, a calculation method of the correction parameter $I_{in}$ is explained by using FIG. 8A. In the present embodiment, at the time of finding the correction parameter $I_{in}$ for one pixel (pixel of interest) in the projector irradiation light amount correction parameter 503, vectors and a coefficient are defined as follows. A normalized vector of a vector that stretches from a point of interest 801 on a document 800 corresponding to the pixel of interest toward the projector 1011 is L, the normalized vector of the normal to the point of interest 801, which has been found at step S704, is N, and a reflection correction coefficient is $I_L$ (see FIG. 8A). In the present embodiment, by applying the Lambert reflection model, the amount of light $I_p$ that enters the camera unit 102 is found by using expression (12) below.

$$I_p = L \cdot N * I_L \quad \text{expression (12)}$$

In other words, it is possible to find the amount of light $I_p$ that enters the camera unit 102 by multiplying the inner product of the vector L and the vector N by the reflection correction coefficient $I_L$.

It is possible to calculate the reflection correction coefficient $I_L$ from expression (13) below by using the luminance value $i_{Max}$ of the white portion in the case where the pixel value of each color of RGB is represented by an n-bit depth.

$$I_L = \frac{i_{Max}}{2^n} \quad \text{expression (13)}$$

At this time, it is possible to calculates the correction parameter $I_{in}$ of each pixel in the projector irradiation light amount correction parameter 503 by using expression (14) below.

$$I_{in} = \left( \frac{i_{Max} - i_{Min}}{2} - (I_p - i_{Min}) + i_{Min} \right) \times d \quad \text{expression (14)}$$

Here, d is a projector irradiation correction coefficient. The projector irradiation correction coefficient d is a constant that is saved in the HDD 204 and which has been generated at the time of the production of the camera scanner 100 by taking into account the amount of light irradiated from the projector 1011 and the sensitivity of the camera unit 102 (generation method of the projector irradiation correction coefficient d will be described later). From expression (14), it is known that correction parameter $I_{in}$ takes a large value in the portion where the amount of light $I_p$ becomes small depending on the shape of the object in the reading area 111 and on the other hand, takes a small value in the portion where the amount of light $I_p$ becomes large depending on the shape of the object.

The correction parameter generation unit 305 generates the projector irradiation light amount correction parameter 503, which is a two-dimensional array, by performing repeatedly the above calculation for each pixel to find the correction parameter $I_{in}$ for each pixel and saves the generated projector irradiation light amount correction parameter 503 in the RAM 202.

In the present embodiment, explanation is given by using the Lambert reflection model as an example of a reflection model, but it is also possible to embody the present invention by using another reflection model such as the Phong reflection model.

The above is the contents of the calculation of the correction parameter $I_{in}$.

<Generation Processing of the Projector Irradiation Correction Coefficient d>

Figure 10A:
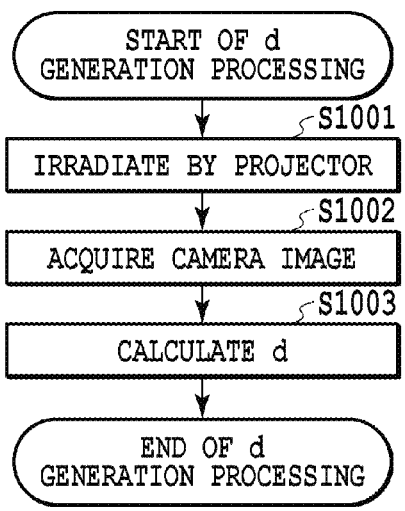
FIG. 10A is a flowchart of generation processing of the coefficient d.

Hereinafter, the generation method of the projector irradiation light amount correction coefficient d in the above-described expression (14) is explained by using FIG. 3B, FIG. 9A, and FIG. 10A.

The generation processing of the projector irradiation light amount correction coefficient d is performed by a coefficient calculation unit, which is a module belonging to the control program of the camera scanner 100. FIG. 3B is a block diagram showing a software configuration of the control program of the camera scanner 100, which is executed by the CPU 201 in the production line. Here, a coefficient calculation unit 307 is a module belonging to the control program only at the time of the production of the camera scanner 100. Consequently, as will be known from FIG. 3A and FIG. 3B, in the case where the scan processing (see FIG. 4A) according to the present embodiment described above is performed, the control program does not have the coefficient calculation unit 307.

By calculating the coefficient d and saving the coefficient d in the HDD 204 in advance at the time of designing the controller unit 101, it is made possible to calculate the correction parameter $I_{in}$ at step S705 described above.

Subsequently, by using FIG. 9A, the position relationship between a document 900, the projector 1011, and the camera unit 102 at the time of the generation of the projector irradiation light amount correction coefficient d is explained. The position relationship between the document 900 and the projector 1011 is determined so that the angle formed by the normalized vector L of a vector that stretches from a point of interest 901 toward the projector 1011, and the normalized vector N of the normal becomes 45 degrees at the time of the generation of the projector irradiation light amount correction coefficient d. Further, the position relationship between the document 900 and the camera unit 102 is determined so that the angle formed by the normalized vector V of the vector that stretches from the point of interest 901 toward the camera unit 102, and the normalized vector N of the normal becomes 45 degrees. Further, in the present embodiment, the Lambert reflection model is supposed as the reflection model of light, and therefore, as the document 900 that reflects light, one made of a matte (non-glossy) material whose entire surface is white is used. In the situation shown in FIG. 9A, the projector irradiation light amount correction coefficient d is generated.

Subsequently, by using FIG. 10A, a flow of the generation processing of the projector irradiation light amount correction coefficient d is explained.

At step S1001, the display control unit 304 controls the projector 1011 via the display controller 207 and causes the projector 1011 to irradiate light onto the reading area 111 based on initial image information. The initial image information used at this step is the same as the initial image information 500 used at step S401.

At step S1002 that is performed while the projector 1011 is irradiating light at S1001, the camera control unit 303 acquires camera image data by controlling the camera unit 102 via the camera I/F 206. The camera image data acquired here is saved in the RAM 202.

At step S1003, the coefficient calculation unit 307 calculates the projector irradiation light amount correction coefficient d by using the camera image data acquired at step S1002. Hereinafter, the calculation method of the projector irradiation light amount correction coefficient d at step S1003 is explained in detail.

In order to calculate the projector irradiation light amount correction coefficient d, first, the luminance value $i_{Max}$ is calculated by using the camera image data acquired at step S1002. It is possible to find the luminance value $i_{Max}$ by using the above-described expression (7). In other words, the luminance value $i_{Max}$ is found by scanning all the pixels of the camera image data and by finding the maximum luminance value from among the luminance values of all the pixels.

Next, from the luminance value $i_{Max}$ that is found, the reflection correction coefficient $I_L$ is calculated by using the above-described expression (13).

Next, from the calculated reflection correction coefficient $I_L$ and the position relationship in FIG. 9A, the amount of light $I_p$ is calculated by using the above-described expression (12).

Next, the luminance value for the pixel of interest corresponding to the point of interest 901 is acquired from the initial image information, and the acquired luminance value is taken to be $I_{in}$, and then, the projector irradiation light amount correction coefficient d is found by using expression (15) below, which is obtained by modifying the above-described expression (14).

$$d = \frac{I_{in}}{\left(\frac{i_{Max} - i_{Min}}{2} - (I_p - i_{Min}) + i_{Min}\right)} \quad \text{expression (15)}$$

The projector irradiation light amount correction coefficient d calculated at step S1003 is saved in the HDD 204 and the generation processing of the projector irradiation light amount correction coefficient d is exited.

The above is the contents of the generation processing of the projector irradiation light amount correction coefficient d.

<Projector Irradiation Processing>

Figure 11:
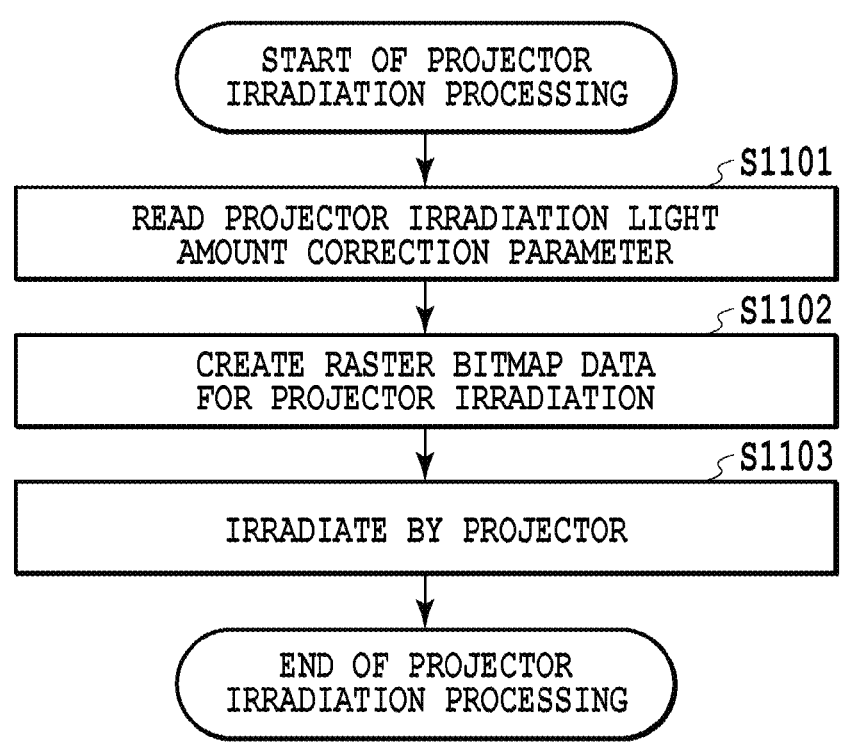
FIG. 11 is a flowchart of projector irradiation processing.

Hereinafter, the above-described projector irradiation processing (step S405 in FIG. 4A) is explained in detail by using FIG. 11.

At step S1101, the display control unit 304 reads the projector irradiation light amount correction parameter 503 saved in the RAM 202 at step S402.

At step S1102, the display control unit 304 creates raster bitmap data for projector irradiation, which includes a pixel value for each pixel that indicates the level of the brightness of light with which a partial area within the irradiation area is irradiated, and saves the raster bitmap data in the RAM 202. Specifically, first, the display control unit 304 initializes the raster bitmap data for projector irradiation, which is the grayscale color space, with a color whose luminance value is 0 (i.e., black). Next, the display control unit 304 calculates each pixel value constituting the raster bitmap data for projector irradiation by using expression (16) below based on the projector irradiation light amount correction parameter 503 read at step S1101.

$$I_{out} = AI_{in} \quad \text{expression (16)}$$

As described above, in the present embodiment, the correction parameter for each pixel in the projector irradiation light amount correction parameter 503 is taken to be $I_{in}$. Further, the affine transformation function that has taken into account the irradiation position of the projector and the number of pixels used to transform the projector irradiation light amount correction parameter 503 is taken to be A.

However, both the projector irradiation light amount correction parameter 503 and the raster bitmap data for projector irradiation are discrete spaces, and therefore, in the present embodiment, it is assumed that the raster bitmap data for projector irradiation is found by using the publicly-known linear interpolation method. Of course, it may also be possible to use an interpolation method other than the linear interpolation method, such as, for example, the bicubic method.

At step S1103, the display control unit 304 causes the projector 1011 to irradiates light onto the reading area 1111 based on the raster bitmap data for projector irradiation saved in the RAM 202 at step S1102. The irradiation is continued until the camera image data acquisition processing (step S406 in FIG. 4A) is completed.

Effects Due to the Present Embodiment

As described above, the camera scanner 100 according to the present embodiment measures the three-dimensional shape of the scan-target object placed in the reading area 111 and derives the normal vector of the surface of the scan-target object. Then, the camera scanner 100 derives the amount of light that enters the camera unit 102 of the light irradiated from the projector 1011 based on the derived normal vector. After this, the camera scanner 100 corrects the amount of light, with which the projector 1011 irradiates the scan-target object, based on the derived amount of light that enters the camera unit 102. Then, the camera scanner 100 captures the image of the scan-target object and acquires the image of the scan-target object while the projector 1011 is performing the irradiation based on the corrected amount of light.

Due to the present embodiment, it is possible to prevent a deterioration in image quality of the acquired image, which is caused by the scan-target object having a three-dimensional shape (e.g., a deterioration in image quality of the acquired image, which is caused by the difference in brightness resulting from the bumps and dips of the scan-target object).

FIG. 12 is a diagram showing an example of the effects due to the present embodiment, showing a scanned image before the correction according to the present embodiment and a scanned image after the correction according to the present embodiment in the case where a book is scanned. In the scanned image before the correction, the left page is dark resulting from the thickness of the book, but in the scanned image after the correction, there is no longer a difference in brightness between the left and right pages, and it is known that the image quality of the scanned image has improved due to the present embodiment.

Further, due to the present embodiment, it is possible to obtain a scanned image for which a difference in brightness or the like resulting from the three-dimensional shape of the scan-target object has been corrected without the need to perform the additional correction processing in the final image processing (step S407 in FIG. 4A).

Second Embodiment

The first embodiment premises that the amount of light other than the light irradiated from the projector 1011, i.e., the amount of ambient light is sufficiently small compared to the amount of irradiated light. However, in the case where the level of brightness of the ambient light is a level that cannot be ignored compared to the irradiated light, the following problem will occur.

In the case where the method of the first embodiment is used in the situation such as this, there is a possibility of an over-correction that the brightness of the dark portion (shadow portion) is corrected so as to be brighter than the bright portion (highlight portion), for example, at the time of correcting the acquired image in which a difference in brightness resulting from the bumps and dips of the scan-target object placed in the reading area 111 exists. The over-correction occurs because the difference in brightness in the light irradiated from the projector 1011, which results from the bumps and dips of the scan-target object, becomes small due to the influence of the ambient light, and therefore, the amount of light with which the dark portion (shadow portion) is irradiated in the projector irradiation processing (step S405 in FIG. 4A) becomes too much.

In the present embodiment, by preventing the over-correction, a scanned image of higher image quality is acquired. Hereinafter, the present embodiment is explained by focusing attention on differences from the first embodiment. In the following explanation, explanation of the contents in common to those of the first embodiment is simplified or omitted.

<Scan Processing Performed by the Camera Scanner 100>

FIG. 4B is a flowchart showing a flow of the scan processing according to the present embodiment, which is performed by the camera scanner 100. The scan processing according to the present embodiment is implemented by the software modules, except for the main control unit 301, of the control program performing the processing sequentially under the comprehensive control of the main control unit 301. FIG. 5B is a data flow diagram explaining the scan processing according to the present embodiment by focusing attention on the data that is saved in the RAM 202. Hereinafter, the scan processing according to the present embodiment is explained in detail by using FIG. 4B and FIG. 5B.

At step S410, the camera control unit 303 acquires camera image data 506 by controlling the camera unit 102 via the camera I/F 206 and capturing the image of the scan-target object irradiated with ambient light. The camera image data 506 acquired by the irradiation with ambient light is saved in the RAM 202.

Steps S411 to S413 are the same as those in the first embodiment (correspond to steps 401 to S403 in the first embodiment).

At step S414, the correction parameter generation unit 305 generates the projector irradiation light amount correction parameter 503 based on the camera image data 506 acquired by the irradiation with ambient light at step S410, the camera image data 501 acquired at step S412, and the distance image information 502 acquired at step S413 and saves the parameter 503 in the RAM 202. Details of this step will be described later.

Steps S415 to S417 are the same as those in the first embodiment (correspond to steps S405 to S407 in the first embodiment).

<Projector Irradiation Light Amount Correction Parameter Generation Processing>

Hereinafter, the above-described projector irradiation light amount correction parameter generation processing (step S414 in FIG. 4B) is explained in detail by using FIG. 7B. FIG. 7B is a flowchart showing a flow of the projector irradiation light amount correction parameter generation processing at step S414.

At step S711, the correction parameter generation unit 305 reads the camera image data 506 obtained by the irradiation with ambient light and saved in the RAM 202.

At step S712, the correction parameter generation unit 305 finds an amount of ambient light $i_{env}$ that enters the camera unit 102 from the camera image data 506 acquired by the irradiation with ambient light and read at step S711. In the present embodiment, an array $L_{cam\_env}$ of the luminance values of the camera image data 506, which is acquired by the irradiation with ambient light, having a width of width pixels and a height of height pixels is defined as $L_{cam\_env}=(L_{env\_11}, L_{env\_12}, L_{env\_13}, \ldots, L_{env\_width\_height})$. Then, the amount of light $i_{env}$ is found by the following processing.

$$i_{env}=\text{Avg}(L_{cam\_env}) \qquad \text{expression (17)}$$

Here, Avg is an operation to find an average value of given luminance values. In other words, at step S712, the amount of light $i_{env}$ is found by scanning all the pixels of the given camera image data 506 acquired by the irradiation with ambient light and averaging the luminance values of all the pixels.

Steps S713 to S716 are the same as those in the first embodiment (correspond to steps S701 to S704 in the first embodiment).

At step S717, the correction parameter generation unit 305 generates the projector irradiation light amount correction parameter 503 including the pixel value of each pixel corresponding to the physical position on the reading area 111 and saves the parameter 503 in the RAM 202.

<Calculation of the Correction Parameter $I_{in}$>

The above-described processing at step S717 is explained in detail. At step S717, first, the correction parameter generation unit 305 initializes the projector irradiation light amount correction parameter 503, which is a two-dimensional array corresponding to the reading area 111, by setting all the array elements of the projector irradiation light amount correction parameter 503 to zero. Next, the correction parameter generation unit 305 calculates the correction parameter $I_{in}$ for each pixel in the projector irradiation light amount correction parameter 503, which is a two-dimensional array.

In the present embodiment, as in the first embodiment, the amount of light $I_p$ that enters the camera unit 102 is found by taking the normalized vector of the vector that stretches from the point of interest 801 toward the projector 1011 to be L, the normalized vector of the normal that is found at step S716 for the point of interest 801 to be N, and the reflection correction coefficient to be $I_L$, by applying the Lambert reflection model, and by using expression (18) below (see FIG. 8A).

$$I_p = L \cdot N^* I_L + i_{env} \qquad \text{expression(18)}$$

As is known from expression (18), it is possible to find the amount of light $I_p$ that enters the camera unit 102 by adding the amount of ambient light $i_{env}$ to the right side of the above-described expression (12).

In the case where the pixel value of each color of RGB is represented by an n-bit depth, it is possible to calculate the reflection correction coefficient $I_L$ from expression (19) below by using the luminance value $i_{Max}$ of the white portion.

$$I_L = \frac{i_{Max}}{2^n} \qquad \text{expression (19)}$$

It is possible to calculate the correction parameter $I_{in}$ of each pixel in the projector irradiation light amount correction parameter 503 by using expression (20) below as in the first embodiment.

$$I_{in} = \left( \frac{i_{Max} - i_{Min}}{2} - (I_p - i_{Min}) + i_{Min} \right) \times d \qquad \text{expression (20)}$$

Here, d is the projector irradiation correction coefficient as in the first embodiment, a constant that is saved in advance in the HDD 204. It is possible to find the projector irradiation correction coefficient d by using expression (15) as in the first embodiment.

The correction parameter generation unit 305 generates the projector irradiation light amount correction parameter 503, which is a two-dimensional array, by performing repeatedly the above calculation for each pixel and by finding the correction parameter $I_{in}$ for each pixel, and saves the parameter 503 in the RAM 202.

Effects Due to the Present Embodiment

Due to the present embodiment, it is possible to obtain data of a scanned image of high quality by preventing an over-correction that may occur in the case where the brightness of ambient light cannot be ignored in comparison to that of light irradiated from the projector.

Third Embodiment

In the first embodiment and the second embodiment, the Lambert reflection model is used as a reflection model of light because the first and second embodiments premise that the irradiation light is diffuse-reflected on the surface of a scan-target document. However, even on matte (non-glossy) paper, the irradiation light is not diffuse-reflected perfectly, and therefore, there is a possibility that a correction error will occur in some scan-target objects. In fact, a kind of paper is known that has a feeling of gloss and strong specular reflection characteristics.

In the case where the irradiation light is not diffuse-reflected perfectly on the surface of a scan-target object (e.g., in the case where the scan-target object is a sheet having the specular reflection characteristics), the intensity of light that is reflected from the surface of the scan-target object and enters the camera unit 102 varies depending on the position of the camera unit 102. Consequently, the more intense the reflected light in accordance with the specular reflection characteristics, the larger becomes the error in correction in the first embodiment and the second embodiment that premise diffuse reflection. Because of this, it is desirable to perform correction that takes into account the position of the camera unit 102 for a certain kind of scan-target document.

In view of the above-described contents, in the present embodiment, the amount of light $I_p$ that enters the camera unit 102 is calculated by also taking into account the specular reflection characteristics of a scan-target object and the correction parameter $I_{in}$ is calculated based on the calculated amount of light $I_p$.

Hereinafter, the present embodiment is explained by focusing attention mainly on the differences from the above-described embodiments. In the following, explanation of the portions in common to those of the above-described embodiments is simplified or omitted.

<Calculation of the Correction Parameter $I_{in}$>

Hereinafter, the calculation method of the correction parameter $I_{in}$ is explained by using FIG. 8B. In the present embodiment, vectors and coefficients are defined as follows in order to find the correction parameter $I_{in}$. That is, the normalized vector of the vector that stretches from the point of interest 801 on the document 800 toward the projector 1011 is taken to be L, the normalized vector of the vector that stretches from the point of interest 801 toward the camera unit 102 is taken to be V, the normalized vector of the normal with respect to the point of interest 801 is taken to be N, and the normalized vector in the direction in which the light that enters from the projector 1011 is regularly reflected at the point of interest 801 is taken to be R (see FIG. 8B). At this time, it is possible to calculate the vector R by using expression (21) below.

$$R = 2^*(L \cdot N)N - L \qquad \text{expression(21)}$$

In the present embodiment, the amount of light $I_p$ that enters the camera unit 102 is found by applying the Fong reflection model and by using expression (22) below.

$$I_p = k_d^* L \cdot N + k_s^* (R \cdot V)^\alpha \qquad \text{expression (22)}$$

Here, $k_d$ and $k_s$ are reflection correction coefficients and $\alpha$ is a specular reflection coefficient. These coefficients are generated by the coefficient calculation unit 307 at the time of the production of the camera scanner 100 (the generation method of these coefficients will be described later).

It is possible to calculate the correction parameter $I_{in}$ of each pixel in the projector irradiation light amount correction parameter 503 by using expression (23) below as in the embodiment described above.

$$I_{in} = \left( \frac{i_{Max} - i_{Min}}{2} - (I_p - i_{Min}) + i_{Min} \right) \times d \qquad \text{expression (23)}$$

Here, d is the projector irradiation correction coefficient as in the embodiment described above.

<Generation Processing of the Reflection Correction Coefficient $k_d$>

Hereinafter, the generation processing of the reflection correction coefficient $k_d$ in expression (22) described above is explained.

First, by using FIG. 9B, the position relationship between the document 900, the projector 1011, and the camera unit 102 at the time of the generation of the reflection correction coefficient $k_d$ is explained. The position relationship between the document 900 and the projector 1011 is determined so that the angle formed by the normalized vector L of the vector that stretches from the point of interest 901 on the document 900 toward the projector 1011, and the normalized vector N of the normal becomes 45 degrees at the time of the generation of the reflection correction coefficient $k_d$. Further, the position relationship between the document 900 and the camera unit 102 is determined so that the vector L and the normalized vector V of the vector that stretches from the point of interest 901 toward the camera unit 102 become equal. In the case where the position relationship between the document 900, the projector 1011, and the camera unit 102 is determined as described above, the angle formed by the vector V and the normalized vector R in the specular reflection direction becomes 90 degrees. Further, in the present embodiment, the Phong reflection model is supposed as the reflection model of light, and therefore, as the document 900 that reflects light, one made of a glossy material whose entire surface is white is used.

Figure 10B:
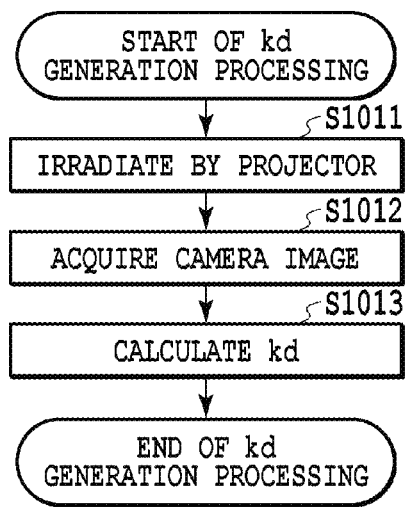
FIG. 10B is a flowchart of generation processing of the coefficient $k_d$.

The reflection correction coefficient $k_d$ is generated in the situation shown in FIG. 9B. Subsequently, a flow of the generation processing of the reflection correction coefficient $k_d$ is explained by using FIG. 10B.

At step S1101, the display control unit 304 controls the projector 1011 via the display controller 207 and causes the projector 1011 to irradiate light onto the reading area 111 based on the initial image information. The initial image information used at this step is the same as the initial image information 500 used at step S401.

At step S1012 that is performed while the projector 1011 is irradiating light at S1101, the camera control unit 303 acquires camera image data by controlling the camera unit 102 via the camera I/F 206. The acquired camera image data is saved in the RAM 202.

At step S1013, the coefficient calculation unit 307 calculates the reflection correction coefficient $k_d$ by using the camera image data acquired at step S1012. Hereinafter, the calculation method of the reflection correction coefficient $k_d$ at step S1013 is explained in detail.

In order to calculate the reflection correction coefficient $k_d$, an expression that is obtained by modifying expression (22) described above is used. In the situation shown in FIG. 9B, the angle formed by the vector R and the vector V is 90 degrees, and therefore, R·V=0 holds. Consequently, expression (22) can be expressed as expression (24) below.

$$I_p = k_d * L \cdot N \quad \text{expression (24)}$$

Further, in the situation shown in FIG. 9B, the angle formed by the vector L and the vector N is 45 degrees, and therefore, expression (24) can be expressed as expression (25) below.

$$I_p = k_d \frac{\sqrt{2}}{2} \quad \text{expression (25)}$$

Consequently, it is possible to calculate the reflection correction coefficient $k_d$ by using expression (26) below.

$$k_d = \frac{2I_p}{\sqrt{2}} \quad \text{expression (26)}$$

As described above, it is possible to calculate the reflection correction coefficient $k_d$ from the amount of light $I_p$ that enters the camera unit 102.

The above is the contents of the generation processing of the reflection correction coefficient $k_d$.

<Generation Processing of the Reflection Correction Coefficient $k_s$>

Hereinafter, the generation processing of the reflection correction coefficient $k_s$ in expression (22) described above is explained.

First, by using FIG. 9A, the position relationship between the document 900, the projector 1011, and the camera unit 102 at the time of the generation of the reflection correction coefficient $k_s$ is explained. The position relationship between the document 900 and the projector 1011 is determined so that the angle formed by the normalized vector L of the vector that stretches from the point of interest 901 on the document 900 toward the projector 1011 and the normalized vector N of the normal becomes 45 degrees at the time of the generation of the reflection correction coefficient $k_s$. Further, the position relationship between the document 900 and the camera unit 102 is determined so that the angle formed by the vector N and the normalized vector V of the vector that stretches from the point of interest 901 toward the camera unit 102 becomes 45 degrees. At this time, the vector L and the normalized vector R in the specular reflection direction are set so that the angle formed by both the vectors becomes 90 degrees. Further, in the present embodiment, the Phong reflection model is supposed as the reflection model of light, and therefore, as the document 900 that reflects light, one made of a glossy material whose entire surface is white is used.

Figure 10C:
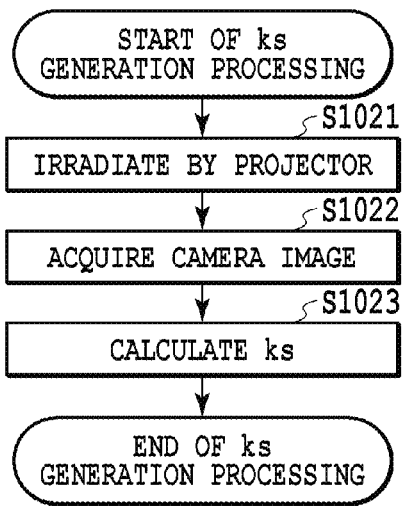
FIG. 10C is a flowchart of generation processing of the coefficient $k_s$.

The reflection correction coefficient $k_s$ is generated in the situation shown in FIG. 9A. Subsequently, a flow of the generation processing of the reflection correction coefficient $k_s$ is explained by using FIG. 10C.

At step S1021, the display control unit 304 controls the projector 1011 via the display controller 207 and causes the projector 1011 to irradiate light onto the reading area 111 based on the initial image information. The initial image information used at this step is the same as the initial image information 500 used at step S401.

At step S1022 that is performed while the projector 1011 is irradiating light at S1021, the camera control unit 303 acquires camera image data by controlling the camera unit 102 via the camera I/F 206. The acquired camera image data is saved in the RAM 202.

At step S1023, the coefficient calculation unit 307 calculates the reflection correction coefficient $k_d$ by using the camera image data acquired at step S1022. Hereinafter, the calculation method of the reflection correction coefficient $k_s$ at step S1023 is explained in detail.

In order to calculate the reflection correction coefficient $k_s$, an expression that is obtained by modifying expression (22) described above is used. In the situation shown in FIG. 9A, the angle formed by the vector R and the vector V is 0 degrees, and therefore, R·V=1 holds. Consequently, expression (22) can be expressed as expression (27) below.

$$I_p = k_d * L \cdot N + k_s \quad \text{expression (27)}$$

Further, in the situation shown in FIG. 9A, the angle formed by the vector L and the vector N is 45 degrees, and therefore, expression (27) can be expressed as expression (28) below.

$$I_p = k_d \frac{\sqrt{2}}{2} + k_s \quad \text{expression (28)}$$

Consequently, it is possible to calculate the reflection correction coefficient $k_s$ by using expression (29) below.

$$k_s = I_p - k_d \frac{\sqrt{2}}{2} \qquad \text{expression (29)}$$

As described above, it is possible to calculate the reflection correction coefficient $k_s$ from the amount of light $I_p$ that enters the camera unit 102 and the reflection correction coefficient $k_d$.

The above is the contents of the generation processing of the reflection correction coefficient $k_s$.

<Generation Processing of the Specular Reflection Coefficient α>

Hereinafter, the generation processing of the specular reflection coefficient α in expression (22) described above is explained.

First, by using FIG. 9C, the position relationship between the document 900, the projector 1011, and the camera unit 102 at the time of the generation of the specular reflection coefficient α is explained. The position relationship between the document 900 and the projector 1011 is determined so that the angle formed by the normalized vector L of the vector that stretches from the point of interest 901 on the document 900 toward the projector 1011 and the normalized vector N of the normal becomes 75 degrees at the time of the generation of the specular reflection coefficient α. Further, the position relationship between the document 900 and the camera unit 102 is determined so that the angle formed by the vector N and the normalized vector V of the vector that stretches from the point of interest 901 toward the camera unit 102 becomes 45 degrees. At this time, the position relationship between the document 900, the projector 1011, and the camera unit 102 is determined so that the angle formed by the vector V and the normalized vector R in the specular reflection direction becomes 30 degrees. Further, in the present embodiment, the Phong reflection model is supposed as the reflection model of light, and therefore, as the document 900 that reflects light, one made of a glossy material whose entire surface is white is used.

Figure 10D:
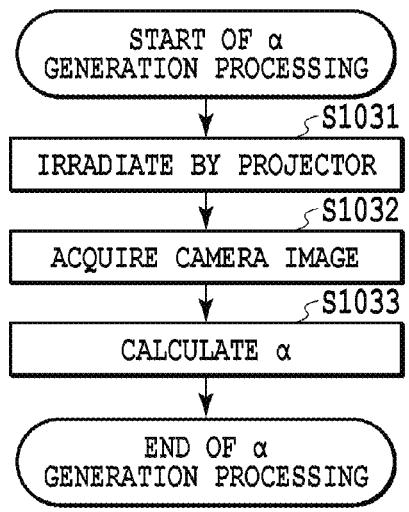
FIG. 10D is a flowchart of generation processing of the coefficient $\alpha$.

The specular reflection coefficient α is generated in the situation shown in FIG. 9C. Subsequently, a flow of the generation processing of the specular reflection coefficient α is explained by using FIG. 10D.

At step S1031, the display control unit 304 controls the projector 1011 via the display controller 207 and causes the projector 1011 to irradiate light onto the reading area 111 based on the initial image information. The initial image information used at this step is the same as the initial image information 500 used at step S401.

At step S1032 that is performed while the projector 1011 is irradiating light at S1031, the camera control unit 303 acquires camera image data by controlling the camera unit 102 via the camera I/F 206. The acquired camera image data is saved in the RAM 202.

At step S1033, the coefficient calculation unit 307 calculates the specular reflection coefficient α by using the camera image data acquired at step S1032. Hereinafter, the calculation method of the specular reflection coefficient α at step S1033 is explained in detail.

In order to calculate the specular reflection coefficient α, an expression that is obtained by modifying expression (22) described above is used. In the situation shown in FIG. 9C, the angle formed by the vector R and the vector V is 30 degrees, and therefore, expression (22) can be expressed as expression (30) below.

$$I_p = k_d * L \cdot N + k_s * \left(\frac{\sqrt{3}}{2}\right)^\alpha \qquad \text{expression (30)}$$

Further, in the situation shown in FIG. 9C, the angle formed by the vector L and the vector N is 75 degrees, and therefore, expression (30) can be expressed as expression (31) below.

$$I_p = k_d * \frac{\sqrt{6} - \sqrt{2}}{4} + k_s * \left(\frac{\sqrt{3}}{2}\right)^\alpha \qquad \text{expression (31)}$$

Consequently, it is possible to calculate the specular reflection coefficient α by using expression (32) below.

$$\left(\frac{\sqrt{3}}{2}\right)^\alpha = \frac{I_p - k_d * \frac{\sqrt{6} - \sqrt{2}}{4}}{k_s} \qquad \text{expression (32)}$$

As described above, it is possible to calculate the specular reflection coefficient α from the amount of light $I_p$ that enters the camera unit 102 and the reflection correction coefficients $k_d$ and $k_s$.

The above is the contents of the generation processing of the specular reflection coefficient α.

By saving in advance the coefficients $k_d$, $k_s$ and a calculated by the above-described processing in the HDD 204, it is made possible to calculate the correction parameter $I_{in}$ for each pixel in the projector irradiation light amount correction parameter 503.

Effects of the Present Embodiment

Due to the present embodiment, it is possible to obtain data of a scanned image of high quality even in the case where a scan-target object has strong specular reflection characteristics.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Due to the present invention, it is made possible to prevent a deterioration in image quality of an acquired image resulting from the shape of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-106020, filed May 22, 2014, and No. 2015-026823, filed Feb. 13, 2015, which are hereby incorporated by reference wherein in their entirety.

What is claimed is:

1. An image reading apparatus that irradiates an object placed on a read table with light from an irradiation unit, captures the object by an image capturing unit, and obtains an image data of the object, the apparatus comprising:
   a measurement unit configured to measure a shape of the object;
   a specifying unit configured to estimate an amount of light which irradiates each position on a surface of the object and which enters the image capturing unit, the estimate being based on the shape of the object measured by the measurement unit and a positional relationship between the irradiation unit and the image capturing unit, and further configured to specify, out of areas on the surface of the object, an area where the amount of light that enters the image capturing unit is less than a predetermined amount of light; and
   a determination unit configured to determine an amount of light with which the irradiation unit irradiates the object,
   wherein the determination unit makes a determination such that the amount of light with which the irradiation unit irradiates the object in an area specified by the specifying unit is greater than that in an area not specified,
   wherein the irradiation unit irradiates the object with light in accordance with the amount of light determined by the determination unit, and
   wherein the image capturing unit captures image data of the object while the irradiation unit is irradiating the object with light in accordance with the determined amount.

2. The image reading apparatus according to claim 1, wherein the measurement unit creates distance image information, which is raster bitmap image having four kinds of pixel values of R, G, B, and distance for each pixel.

3. The image reading apparatus according to claim 2, wherein the determination unit derives a normal vector of a surface of the object based on the distance image information.

4. The image reading apparatus according to claim 3, wherein the determination unit derives an amount of light that is irradiated by the irradiation unit, reflected from the surface of the object, and enters the image capturing unit based on the derived normal vector.

5. The image reading apparatus according to claim 4, wherein the amount of light that is derived is calculated by expression below $$I_p = L \cdot N * I_L$$

where $I_p$ is an amount of light, L is a normalized vector of a vector that stretches from a point of interest of the object toward the irradiation unit, N is a normalized vector of a normal of the surface of the object at the point of interest, and $I_L$ is a reflection correction coefficient.

6. The image reading apparatus according to claim 4, wherein the amount of light that is derived is calculated by expression below $$I_p = k_d * L \cdot N + k_s * (R \cdot V)^\alpha$$

where $I_p$ is an amount of light, L is a normalized vector of a vector that stretches from a point of interest of the object toward the irradiation unit, N is a normalized vector of a normal of the surface of the object at the point of interest, V is a normalized vector of a vector that stretches from the point of interest toward the image capturing unit, R is a normalized vector in a direction in which light that enters from the irradiation unit at the point of interest is regularly reflected, $k_d$ and $k_s$ are reflection correction coefficients, and a is a specular reflection coefficient.

7. The image reading apparatus according to claim 4, wherein the determination unit derives a correction parameter based on the derived amount of light for each pixel in raster bitmap data.

8. The image reading apparatus according to claim 7, wherein the correction parameter $I_{in}$ of each pixel is calculated by expression below $$I_{in} = \left( \frac{i_{Max} - i_{Min}}{2} - (I_p - i_{Min}) + i_{Min} \right) \times d$$

where $i_{Max}$ is a maximum luminance value from among luminance values of all pixels, $i_{Min}$ is a minimum luminance value from among luminance values of all pixels, $I_p$ is an amount of light, and d is a pre-stored constant for an irradiation correction coefficient.

9. The image reading apparatus according to claim 1, wherein the measurement unit includes:
   a projection unit configured to project an infrared pattern onto the object;
   a reading unit configured to read an infrared pattern projected onto the object; and
   an RGB camera.

10. An image reading method performed in an image reading apparatus that irradiates an object placed on a read table with light from an irradiation unit, captures the object by an image capturing unit, and obtains an image data of the object, the method comprising
    a measurement step of measuring a shape of the object;
    an estimating step of estimating an amount of light which irradiates each position on a surface of the object and which enters the image capturing unit, the estimate being based on the shape of the object measured by the measurement step and a positional relationship between the irradiation unit and the image capturing unit;

a specifying step of specifying, out of areas on the surface of the object, an area where the amount of light that enters the image capturing unit is less than a predetermined amount of light;

a determination step of determining an amount of light with which the irradiation unit irradiates the object, wherein the determination is made such that the amount of light with which the irradiation unit irradiates the object in an area specified by the specifying step is greater than that in an area not specified;

an irradiating step of irradiating the object with light by the irradiation unit in accordance with the amount of light determined by the determination step; and a capturing step of capturing image data of the object by the image capturing unit while the irradiation unit is irradiating the object with light in accordance with the determined amount.

11. A non-transitory computer readable storage medium storing a program for causing a computer to function as an image reading apparatus that irradiates an object placed on a read table with light from an irradiation unit, captures the object by an image capturing unit, and obtains an image data of the object, wherein the image reading apparatus performs a method comprising:

a measurement step of measuring a shape of the object;

an estimating step of estimating an amount of light which irradiates each position on a surface of the object and which enters the image capturing unit, the estimate being based on the shape of the object measured by the measurement step and a positional relationship between the irradiation unit and the image capturing unit;

a specifying step of specifying, out of areas on the surface of the object, an area where the amount of light that enters the image capturing unit is less than a predetermined amount of light;

a determination step of determining an amount of light with which the irradiation unit irradiates the object, wherein the determination is made such that the amount of light with which the irradiation unit irradiates the object in an area specified by the specifying step is greater than that in an area not specified;

an irradiating step of irradiating the object with light by the irradiation unit in accordance with the amount of light determined by the determination step; and a capturing step of capturing image data of the object by the image capturing unit while the irradiation unit is irradiating the object with light in accordance with the determined amount.

* * * * *